(12) United States Patent
Liu et al.

(10) Patent No.: US 11,557,758 B2
(45) Date of Patent: Jan. 17, 2023

(54) SOLVENT-FREE DRY POWDER PROCESS TO INCORPORATE CERAMIC PARTICLES INTO ELECTROCHEMICAL CELL COMPONENTS

(71) Applicant: GM GLOBAL TECHNOLOGY OPERATIONS LLC, Detroit, MI (US)

(72) Inventors: Jin Liu, Royal Oak, MI (US); Xingcheng Xiao, Troy, MI (US); Meinan He, Madison Heights, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 16/863,655

(22) Filed: Apr. 30, 2020

(65) Prior Publication Data

US 2021/0344004 A1  Nov. 4, 2021

(51) Int. Cl.
*H01M 4/36* (2006.01)
*H01M 4/62* (2006.01)
(Continued)

(52) U.S. Cl.
CPC .......... *H01M 4/366* (2013.01); *H01M 4/505* (2013.01); *H01M 4/525* (2013.01); *H01M 4/622* (2013.01);
(Continued)

(58) Field of Classification Search
None
See application file for complete search history.

(56) References Cited

U.S. PATENT DOCUMENTS 8,974,946 B2   3/2015 Cai et al.
9,123,939 B2   9/2015 Xiao et al.
(Continued)

FOREIGN PATENT DOCUMENTS

| CN | 113594405 A | 11/2021 |
| DE | 102021106920 A1 | 11/2021 |
| WO | 2017045573 A1 | 3/2017 |

OTHER PUBLICATIONS

Vetter, J. et al., "Ageing mechanisms in lithiu-ion batteries," Journal of Power Sources 147 (2005), pp. 269-281 (Published online Mar. 14, 2005) DOI: 10.1016/j.powsour.2005.01.006.
(Continued)

*Primary Examiner* — Wyatt P McConnell
(74) *Attorney, Agent, or Firm* — Harness, Dickey & Pierce, P.L.C.

(57) ABSTRACT

Solvent-free methods of making a component, like an electrode, for an electrochemical cell are provided. A particle mixture is processed in a dry-coating device having a rotatable vessel defining a cavity with a rotor. The rotatable vessel is rotated at a first speed in a first direction and the rotor at a second speed in a second opposite direction. The particle mixture includes first inorganic particles (e.g., electroactive particles), second inorganic particles (e.g., ceramic HF scavenging particles), and third particles (e.g., electrically conductive carbon-containing particles). The dry coating creates coated particles each having a surface coating (including second inorganic particles and third particles) disposed over a core region (the first inorganic particle). The coated particles are mixed with polymeric particles in a planetary and centrifugal mixer that rotates about a first axis and revolves about a second axis. The polymeric particles surround each of the plurality of coated particles.

19 Claims, 9 Drawing Sheets

(51) Int. Cl.
*H01M 10/0525* (2010.01)
*H01M 4/505* (2010.01)
*H01M 4/525* (2010.01)
*H01M 4/02* (2006.01)

(52) U.S. Cl.
CPC ....... *H01M 4/625* (2013.01); *H01M 10/0525* (2013.01); *H01M 2004/021* (2013.01)

(56) References Cited

U.S. PATENT DOCUMENTS

| | | | |
|---|---|---|---|
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,362,552 | B2 | 6/2016 | Sohn et al. |
| 9,373,829 | B2 | 6/2016 | Xiao et al. |
| 9,437,871 | B2 | 9/2016 | Zhou et al. |
| 9,537,144 | B2 | 1/2017 | Huang et al. |
| 9,647,254 | B2 | 5/2017 | Dadheech et al. |
| 9,742,028 | B2 | 8/2017 | Zhou et al. |
| 9,896,763 | B2 | 2/2018 | Dadheech et al. |
| 9,905,847 | B2 | 2/2018 | Dadheech et al. |
| 9,923,189 | B2 | 3/2018 | Xiao |
| 9,929,435 | B2 | 3/2018 | Cai et al. |
| 9,979,008 | B2 | 5/2018 | Dai et al. |
| 9,985,284 | B2 | 5/2018 | Dadheech et al. |
| 10,084,204 | B2 | 9/2018 | Dai et al. |
| 10,128,481 | B2 | 11/2018 | Xiao et al. |
| 10,141,559 | B2 | 11/2018 | Xiao et al. |
| 10,199,643 | B2 | 2/2019 | Zhou et al. |
| 10,312,501 | B2 | 6/2019 | Yang et al. |
| 10,326,166 | B2 | 6/2019 | Yang et al. |
| 10,367,201 | B2 | 7/2019 | Yang et al. |
| 10,381,170 | B2 | 8/2019 | Dai et al. |
| 10,396,360 | B2 | 8/2019 | Xiao et al. |
| 10,431,849 | B2 | 10/2019 | Yersak et al. |
| 10,476,074 | B2 | 11/2019 | Xiao et al. |
| 10,573,879 | B2 | 2/2020 | Yang et al. |
| 10,622,627 | B2 | 4/2020 | Dadheech et al. |
| 10,629,941 | B2 | 4/2020 | Dai et al. |
| 11,094,996 | B2 | 8/2021 | Xiao et al. |
| 11,094,998 | B2 | 8/2021 | Xiao et al. |
| 11,404,698 | B2 | 8/2022 | Xu et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0349307 | A1 | 12/2015 | Dadheech et al. |
| 2016/0111721 | A1 | 4/2016 | Xiao et al. |
| 2016/0172706 | A1 | 6/2016 | Xiao et al. |
| 2016/0172710 | A1 | 6/2016 | Liu et al. |
| 2017/0271678 | A1 | 9/2017 | Yang et al. |
| 2018/0294517 | A1 | 10/2018 | Yersak et al. |
| 2018/0309166 | A1 | 10/2018 | Yersak et al. |
| 2018/0375148 | A1 | 12/2018 | Yersak et al. |
| 2019/0036111 | A1* | 1/2019 | Xiao .................. H01M 4/364 |
| 2019/0341615 | A1 | 11/2019 | Xiao et al. |
| 2019/0372155 | A1 | 12/2019 | Yersak et al. |
| 2019/0393549 | A1 | 12/2019 | Yersak et al. |
| 2020/0052338 | A1 | 2/2020 | Liu et al. |
| 2020/0127282 | A1 | 4/2020 | Yersak et al. |
| 2020/0395630 | A1 | 12/2020 | Yersak et al. |
| 2021/0083294 | A1 | 3/2021 | Xiao et al. |

OTHER PUBLICATIONS

Xiao, Xingcheng et al., U.S. Appl. No. 16/573,605, filed Sep. 17, 2019 entitled, "Electrode Additives and Coatings for Minimizing Cathode Transition Metal Dissolution," 53 pages.

Xiao, Xingcheng et al., U.S. Appl. No. 16/575,143, filed Sep. 18, 2019 entitled, "Additive to Ceramic Ion Conducting Material to Mitigate the Resistive Effect of Surface Carbonates and Hydroxides," 51 pages.

Xu, Jiagang et al., U.S. Appl. No. 16/668,904, filed Oct. 30, 2019 entitled, "Liquid Metal Interfacial Layers for Solid Electrolytes and Methods Thereof," 44 pages.

Xiao, Xingcheng et al., U.S. Appl. No. 16/445,610, filed Jun. 19, 2019 entitled, "Ceramic-Coated Separators for Lithium-Containing Electrochemical Cells and Methods of Making the Same," 47 pages.

* cited by examiner

SOLVENT-FREE DRY POWDER PROCESS TO INCORPORATE CERAMIC PARTICLES INTO ELECTROCHEMICAL CELL COMPONENTS

INTRODUCTION

This section provides background information related to the present disclosure which is not necessarily prior art.

The present disclosure relates to solvent-free methods of making components for an electrochemical cell, such as an electrode for an electrochemical cell that cycles lithium ions. A particle mixture comprising inorganic particles is introduced into a rotatable dry-coating device and processed to form coated particles, followed by mixing the coated particles with polymeric particles in a planetary and centrifugal mixer that rotates about a first axis and revolves about a second axis, so that a portion of the polymeric particles surrounds each of the coated particles.

Electrochemical energy storage devices, such as lithium-ion batteries, can be used in a variety of products, including automotive products, such as start-stop systems (e.g., 12V start-stop systems), battery-assisted systems ("µBAS"), Hybrid Electric Vehicles ("HEVs"), and Electric Vehicles ("EVs"). Typical lithium-ion batteries include two electrodes, a separator, and an electrolyte. However, in solid-state or semi-solid state batteries, the separator and solid-state electrolyte may be a single component. Lithium-ion batteries may also include various terminal and packaging materials. In electrochemical cells, such as in lithium-ion batteries, one of the two electrodes serves as a positive electrode or cathode, and the other electrode serves as a negative electrode or anode.

Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In solid-state batteries, which include a solid-state electrolyte disposed between solid-state electrodes, the solid-state electrolyte physically separates the electrodes so that a distinct separator is not required.

Lithium-ion batteries often include cathode active materials that include transition metals (e.g., manganese (Mn)), such as lithium manganese-based oxides (e.g., $LiMnO_2$ (LMO)). Certain outstanding challenges to using these conventional lithium manganese oxide based materials as lithium-ion batteries remain, especially in electric vehicles. One issue is capacity fade, which may be attributable to transition metal dissolution and deposition. For example, manganese (Mn) dissolution in a lithium-ion battery using a lithium-ion manganese oxide cathode active material has been observed and is believed to be due to the disproportionation reaction ($2Mn^{3+} \rightarrow Mn^{4+} + Mn^{2+}$) at the particle surface, which can result in the formation of a defect spinel. The transition metal release at the cathode is believed to be promoted by the presence or generation of water in liquid electrolyte that may contain $LiPF_6$ in a carbonate-based organic solvent. If any water is present or created in the electrolyte, it may potentially react with the $LiPF_6$ to generate HF, LiF, and $H_3PO_4$, especially at elevated temperatures of from about 40° C. to about 60° C. The HF can react with the cathode active material, causing the release of transition metal ions (e.g., $Mn^{2+}$). This phenomenon of transition metal ion release is known as transition metal dissolution. Because of transition metal dissolution, the transition metal ions can precipitate back onto the cathode or migrate to and become deposited on an anode, resulting in cathode active material loss, fading capacity, damage to a solid electrolyte interphase layer, and/or blocking of lithium intercalation into the negative electrode.

Separators have been coated with ceramic materials like silicon dioxide ($SiO_2$) and aluminum oxide ($Al_2O_3$) for scavenging HF. The $SiO_2$ and $Al_2O_3$ react with the HF to generate hydrates $SiF_4 \cdot XH_2O$ and $AlF_3 \cdot XH_2O$, respectively. However, at elevated temperatures, the water molecules release from the hydrates, potentially promoting further hydrolysis of $LiPF_6$. Accordingly, HF scavenger moieties that do not release water at elevated temperatures are desirable. Moreover, methods of evenly distributing such HF scavenger moieties in the components of the electrochemical cell would be desirable.

SUMMARY

This section provides a general summary of the disclosure, and is not a comprehensive disclosure of its full scope or all of its features.

The present disclosure relates to a method of making a component for an electrochemical cell. The method includes forming a plurality of coated particles each having a surface coating disposed over a core region by processing a particle mixture including a plurality of first inorganic particles and a plurality of second inorganic particles in a dry-coating device. The dry-coating device includes a rotatable vessel defining a cavity with a rotor disposed within the cavity. The processing includes rotating the rotatable vessel at a first speed in a first direction and rotating the rotor at a second speed greater than the first speed in a second direction opposite to the first direction to create the plurality of coated particles. The core region includes one of the first inorganic particles and the surface coating includes a portion of the plurality of the second inorganic particles. The plurality of coated particles is then mixed with a plurality of polymeric particles in a planetary and centrifugal mixer that rotates about a first axis and revolves about a second axis, so that a portion of the plurality of polymeric particles surrounds each of the plurality of coated particles.

In one aspect, the particle mixture further includes a plurality of third particles and the surface coating includes the portion of the plurality of the second inorganic particles and further includes a portion of the plurality of the third particles.

In one aspect, the processing includes initially introducing the particle mixture including the plurality of first inorganic particles and the plurality of second inorganic particles in the dry-coating device. The plurality of coated particles each has a first surface coating including the plurality of second inorganic particles disposed over the core region. The processing further includes subsequently adding a plurality of third particles in the dry-coating device and further rotating the rotatable vessel at the first speed in the first direction and rotating the rotor at the second speed in the second direction to form a second coating including the plurality of third particles disposed over the first coating. The surface coating that is formed is multilayered.

In one aspect, the first speed of the rotatable vessel is greater than or equal to about 50 rpm to less than or equal to about 100 rpm. The second speed of the rotor is greater than or equal to about 1,000 rpm to less than or equal to about 10,000 rpm. The rotatable vessel and the rotor are rotated for greater than or equal to about 5 minutes to less than or equal to about 300 minutes.

In one aspect, the rotatable vessel and the rotor are rotated for two distinct cycles, where each of the two distinct cycles is greater than or equal to about 5 minutes to less than or equal to about 120 minutes.

In one aspect, the planetary and centrifugal mixer rotates about the first axis at greater than or equal to about 100 rpm to less than or equal to about 1,000 rpm and revolves about the second axis at greater than or equal to about 100 rpm to less than or equal to about 1,000 rpm. The planetary and centrifugal mixer is operated for greater than or equal to about 30 seconds to less than or equal to about 15 minutes.

In one aspect, the planetary and centrifugal mixer is operated for four distinct cycles, wherein each of the four distinct cycles is greater than or equal to about 1 minute to less than or equal to about 5 minutes.

In one aspect, the particle mixture flows between a wall defining the cavity and the rotor at a clearance of greater than or equal to about 0.025 mm to less than or equal to about 1 mm. The particle mixture is subjected to shear forces and compression to create a substantially uniform surface coating including the portion of the plurality of the second inorganic particles and the portion of the plurality of the third particles.

In one aspect, the surface coating covers greater than or equal to about 70% of an exposed surface of the core region of each of the first inorganic particles.

In one aspect, a first average diameter ($D_1$) of the plurality of the first inorganic particles is greater than or equal to about 1 μm to less than or equal to about 100 μm, a second average diameter ($D_2$) of the plurality of the second inorganic particles is greater than 100 nm to less than or equal to about 5 μm, a third average diameter ($D_3$) of the plurality of the third particles is greater than 50 nm to less than or equal to about 50 μm, and fourth average diameter ($D_4$) of the polymeric particles is greater than or equal to about 10 nm to less than or equal to about 10 μm.

In one aspect, the plurality of first inorganic particles includes an electroactive material, the plurality of second inorganic particles includes a ceramic material, and the plurality of third particles includes an electrically conductive carbon-containing material.

In one aspect, the plurality of first inorganic particles includes an electroactive material selected from the group consisting of: lithium manganese oxide ($Li_{(1+x)}Mn_{(2-x)}O_4$), where $0 \leq x \leq 1$ (LMO), lithium manganese nickel oxide ($LiMn_{(2-x)}Ni_xO_4$), where $0 \leq x \leq 1$ (LMNO), doped and undoped lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (NMC), and Ni-rich $Li[Ni_{0.89}Co_{0.05}Mn_{0.05}Al_{0.01}]O_2$ (NCMA), NCMA, and combinations thereof. The plurality of second inorganic particles includes a ceramic hydrogen fluoride (HF) scavenger including $M_2SiO_3$, $MAlO_2$, $M_2O$—$Al_2O_3$—$SiO_2$, $Al_2O_3$, $SiO_2$, $ZrO_2$, $MgO$, $Nb_2O_5$, or combinations thereof, where M is Li, Na, or combinations thereof or an oxide-based solid electrolyte including $Li_5La_3M_2O_{12}$, $Li_2O$—$La_2O_3$-$M_2O_5$, where M is niobium (Nb) or tantalum (Ta), $LiAlTi(PO_4)_2$, $Li_{2+2x}Zn_{1-x}GeO_4$, or $Li_{(3+x)}Ge_xV_{(1-x)}O_4$, where x is 0 and 1, or combinations thereof. The plurality of third particles includes an electrically conductive carbon-containing material selected from the group consisting of: carbon black, acetylene black, carbon nanotubes, and combinations thereof. The plurality of polymeric particles is selected from the group consisting of: polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, and combinations thereof.

The present disclosure further relates to a method of making a component for an electrode for an electrochemical cell without solvents. The method includes forming a plurality of coated particles each having a surface coating disposed over a core region. The method includes processing a plurality of first particles including an electroactive material, a plurality of second particles including a ceramic material, and a plurality of third particles including a carbon-containing material in a dry-coating device. The dry-coating device includes a rotatable vessel defining a cavity with a rotor disposed within the cavity. The processing is achieved by rotating the rotatable vessel at a first speed in a first direction and rotating the rotor at a second speed greater than the first speed in a second direction opposite to the first direction. The core region includes a portion of the plurality of the first particles and the surface coating includes a portion of the plurality of the second particles and a portion of the plurality of the third particles. The method also includes mixing the plurality of coated particles with a plurality of binder particles in a planetary and centrifugal mixer that rotates about a first axis and revolves about a second axis to form a mixture in which a portion of the plurality of binder particles surrounds each of the plurality of coated particles. The method further includes dry spraying the mixture onto a current collector. Further, the mixture may be consolidated by applying heat and pressure to form a porous electrode including the plurality of first particles including an electroactive material having a coating including a ceramic and a carbon-containing material distributed in a matrix of the binder.

In one aspect the first speed of the rotatable vessel is greater than or equal to about 50 rpm to less than or equal to about 100 rpm and the second speed of the rotor is greater than or equal to about 1,000 rpm to less than or equal to about 10,000 rpm. The rotatable vessel and the rotor are rotated for greater than or equal to about 5 minutes to less than or equal to about 300 minutes.

In one aspect, the planetary and centrifugal mixer rotates about the first axis at greater than or equal to about 100 rpm to less than or equal to about 1,000 rpm and revolves about the second axis at greater than or equal to about 100 rpm to less than or equal to about 1,000 rpm. The planetary and centrifugal mixer is operated for greater than or equal to about 30 seconds to less than or equal to about 15 minutes.

In one aspect, the particle mixture flows between the wall defining the cavity and the rotor at a clearance of greater than or equal to about 0.025 mm to less than or equal to about 1 mm. The particle mixture is subjected to shear forces and compression to create a substantially uniform surface coating including the portion of the plurality of the second inorganic particles and the portion of the plurality of the third particles.

In one aspect, the surface coating covers greater than or equal to about 70% of an exposed surface of the core region of each of the first inorganic particles.

In one aspect, the consolidating is conducted by passing the mixture between a pair of hot rollers or hot plates. A temperature applied by the pair of hot rollers or hot plates is greater than or equal to about 30° C. to less than or equal to about 150° C. A pressure applied is greater than or equal to about 1 Pa to less than or equal to about 10 MPa. The electrode formed has a porosity of greater than or equal to about 15 vol. % to less than or equal to about 50 vol. % and a thickness of the electrode is greater than or equal to about 5 μm to less than or equal to about 500 μm.

In one aspect, the plurality of first particles including the electroactive material is selected from the group consisting of: lithium manganese oxide ($Li_{(1+x)}Mn_{(2-x)}O_4$), where $0 \leq x \leq 1$ (LMO), lithium manganese nickel oxide ($LiMn_{(2-x)}Ni_xO_4$), where $0 \leq x \leq 1$ (LMNO), doped and undoped lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (NMC), Ni-rich $Li[Ni_{0.89}Co_{0.05}Mn_{0.05}Al_{0.01}]O_2$ (NCMA), and combinations thereof. The plurality of second inorganic particles including the ceramic material is selected from the group consisting of: $Li_2SiO_3$, $LiAlO_2$, $Li_2O$—$Al_2O_3$—$SiO_2$, $Na_2SiO_3$, $NaAlO_2$, $Na_2O$—$Al_2O_3$—$SiO_2$, $Li_5La_3M_2O_{12}$, where M is niobium (Nb) or tantalum (Ta), $Li_2O$—$La_2O_3$-$M_2O_5$, where M is niobium (Nb) or tantalum (Ta), $LiAlTi(PO_4)_2$, $Li_{2+2x}Zn_{1-x}GeO_4$ or $Li_{(3+x)}Ge_xV_{(1-x)}O_4$, where x is 0 and 1, and combinations thereof. The plurality of third particles including a carbon-containing material is selected from the group consisting of: carbon black, acetylene black, carbon nanotubes, and combinations thereof. The plurality of binder particles is selected from the group consisting of: polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, and combinations thereof.

The present disclosure further relates to an electrode for an electrochemical cell that cycles lithium. The electrode includes a current collector, a porous layer including a plurality of electroactive particles, wherein each of the plurality of electroactive particles defines a surface having a coating including a plurality of ceramic particles and a plurality of carbon-containing particles and the plurality of electroactive particles is homogeneously distributed in a matrix of a polymeric binder.

In one aspect, the plurality of electroactive particles is selected from the group consisting of: lithium manganese oxide ($Li_{(1+x)}Mn_{(2-x)}O_4$), where $0 \leq x \leq 1$ (LMO), lithium manganese nickel oxide ($LiMn_{(2-x)}Ni_xO_4$), where $0 \leq x \leq 1$ (LMNO), doped and undoped lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (NMC), Ni-rich $Li[Ni_{0.89}Co_{0.05}Mn_{0.05}Al_{0.01}]O_2$ (NCMA), NCMA, and combinations thereof.

In one aspect, the plurality of electroactive particles is present at greater than or equal to about 60 wt. % to less than or equal to about 95 wt. % of the porous layer. The plurality of plurality of ceramic particles is present at greater than or equal to about 0.1 wt. % to less than or equal to about 20 wt. % of the porous layer. The plurality of carbon-containing particles is present at greater than or equal to about 1 wt. % to less than or equal to about 20 wt. % of the porous layer. The polymeric binder is present at greater than or equal to about 1 wt. % to less than or equal to about 20 wt. % of the porous layer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3A shows an intermediate dry-coated electroactive material particle product having a multilayered coating. FIG. 3B shows an intermediate particle product having a hybrid or composite coating.

Corresponding reference numerals indicate corresponding parts throughout the several views of the drawings.

DETAILED DESCRIPTION

Figure 1:
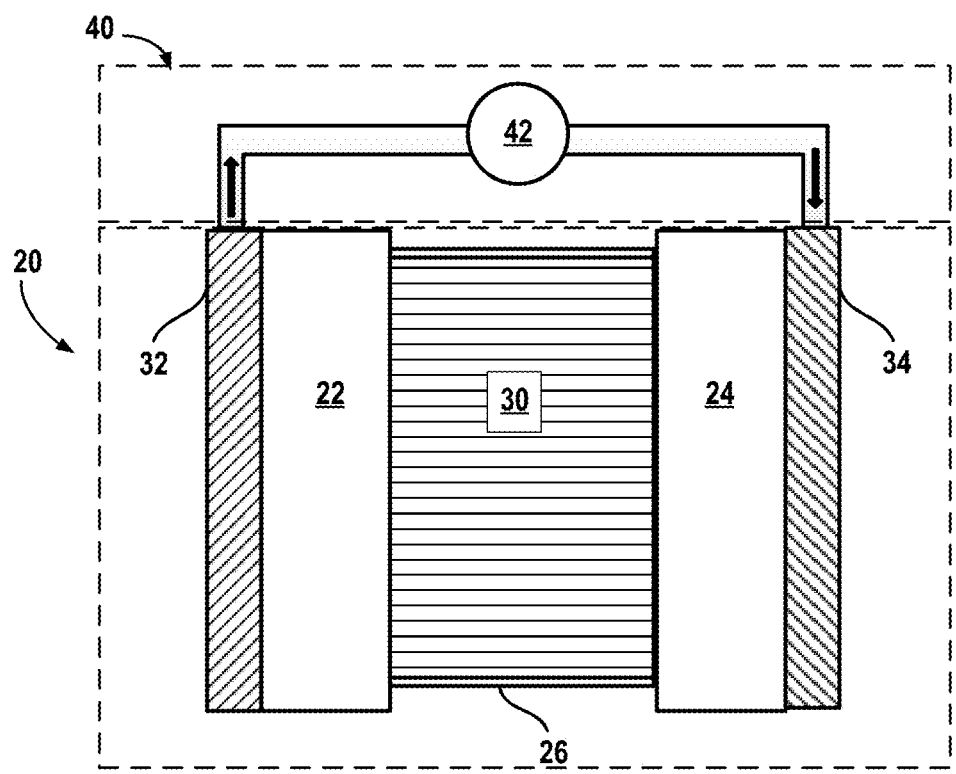
FIG. 1 is a schematic of an example of an electrochemical battery cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Lithium-ion batteries often include cathode active materials that include transition metals (e.g., manganese (Mn)), such as lithium manganese-based oxides (e.g., $LiMnO_2$ (LMO)). As noted above, transition metal (e.g., Mn) dissolution in a lithium-ion battery using a lithium-containing electroactive material, like lithium manganese oxide cathode active material, has been observed and is believed to be due to the disproportionation reaction ($2Mn^{3+} \rightarrow Mn^{4+} + Mn^{2+}$) at the particle surface, which can result in the formation of a defect spinel. Further, hydrogen fluoride (HF) may be generated in liquid electrolyte that contains $LiPF_6$. For example, if any water is present or created in the electrolyte, it may potentially react with the $LiPF_6$ to generate HF, LiF, and $H_3PO_4$, especially at elevated temperatures of from about 40° C. to about 60° C. The HF can react with the cathode active material, causing the release of transition metal ions (e.g., $Mn^{2+}$). The capacity loss related to Mn dissolution is believed to be generally attributed to two processes. The first is that $Mn^{2+}$ can be irreversibly dissolved from the positive electrode into the electrolyte (especially in the presence of hydrofluoric acid (HF)), leading to a potentially permanent loss of positive electrode materials and a decrease in capacity for hosting Li. The second process is that the $Mn^{2+}$ can migrate through the electrolyte to the negative electrode, and deposit on the negative electrode surface. It is speculated that the deposition of $Mn^{2+}$ ion occurs either as Mn oxide on the negative electrode, especially on graphite-containing negative electrodes, where it potentially may block lithium ion ($Li^+$) transport leading to decreased ion conductivity, or that the manganese forms metallic Mn clusters, which can potentially lead to continuous decomposition of the electrolyte. This phenomenon of transition metal ion release is known as transition metal dissolution. As a result of transition metal dissolution, the transition metal ions can precipitate back onto the cathode or migrate to and become deposited on an anode, resulting in cathode active material loss, fading capacity, damage to a solid electrolyte interphase layer, and/or blocking of lithium intercalation into the negative electrode.

Therefore, as noted above, separators having ceramic coatings, such as $SiO_2$ and $Al_2O_3$, have been used to scavenge HF. The $SiO_2$ and $Al_2O_3$ react with the HF to generate the hydrates $SiF_4.XH_2O$ and $AlF_3.XH_2O$, respectively. However, at elevated temperatures, the water molecules can be released from the hydrates, promoting further hydrolysis of $LiPF_6$ and generation of HF. Accordingly, HF scavengers that do not release water at elevated temperatures are desirable. As will be described in more detail below, ceramic hydrofluoric acid (HF) scavengers can be incorporated into various battery components, for example, embedded into electrodes or included in electrode coatings. Such ceramic HF scavengers are described in commonly owned U.S. patent application Ser. No. 16/573,605 filed on Sep. 17, 2019, entitled "ELECTRODE ADDITIVES AND COATINGS FOR MINIMIZING CATHODE TRANSITION METAL DISSOLUTION," the relevant portions of which are incorporated herein by reference. Such ceramic HF scavengers trap protons, for example, from HF, without forming hydrates that can be released with the electrochemical cell environment at elevated temperatures. As a result, transition metal dissolution is prevented, inhibited, relatively decreased, or minimized. However, it has been observed that conventional slurry casting and powder mixing processes for forming electrochemical cell components incorporating such ceramic HF scavengers could be improved to enhance the homogeneity of dispersion of the various constituents, including the ceramic HF scavengers.

The present disclosure provides solvent-free dry powder processing methods of making components for an electrochemical cell, such as an electrode, having enhanced homogeneity of distribution of the particles/dry constituents. The method involves covering larger particles with a various types of small particles through the dry powder mixing process. Electrodes or other components formed by such methods thus provide an electrochemical cell that cycles lithium ions having improved long-term performance. The present methods improve electrochemical cell performance when electrodes are formed via slurry mixing and or dry powder mixing, where precursor distribution is potentially uneven. In various aspects, such electrochemical cells that cycle lithium ions, including lithium ion batteries, may be used in automotive transportation or vehicles (e.g., automobiles, motorcycles, boats, tractors, buses, mobile homes, campers, and tanks), but they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example applications.

An exemplary schematic illustration of an electrochemical cell or battery 20 (also referred to as the battery, which comprises at least one electrochemical cell) that cycles ions is shown in FIG. 1. Unless specifically indicated otherwise, the term "ions" as used herein refers to lithium ions or sodium ions. For example, an electrochemical cell that cycles sodium ions has similar components as the battery 20 that cycles lithium ions, but replaces the lithium and lithium ions with sodium and sodium ions in corresponding components. The battery 20 includes a negative electrode (i.e., an anode) 22, a positive electrode (i.e., a cathode) 24, and a separator 26 (e.g., a microporous polymeric separator) disposed between the two electrodes 22, 24. An electrolyte 30 is present throughout the separator 26 and, optionally, in the negative electrode 22 and positive electrode 24. A negative electrode current collector 32 may be positioned at or near the negative electrode 22 and a positive electrode current collector 34 may be positioned at or near the positive electrode 24. While not shown, the negative electrode current collector 32 and the positive electrode current collector 34 may be coated on one or both sides, as is known in the art. In certain aspects, the current collectors 32, 34 may be coated with an electrode active material/electrode layer on both sides. The negative electrode current collector 32 and positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24.

The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

While the load device 42 may be any number of known electrically powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. Accordingly, the lithium-ion battery 20 can generate electric current for the load device 42 that can be operatively connected to the external circuit 40.

In many lithium ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. Where the electrolyte 30 is a liquid or semi-solid, the separator 26, in addition to providing a physical barrier between the two electrodes 22, 24, acts like a sponge that contains the electrolyte 30 in a network of open pores during the cycling of lithium ions, to facilitate functioning of the battery 20.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output, energy, and power if it is required by the load device 42.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

A non-limiting list of lithium salts that may be dissolved in an organic solvent to form the nonaqueous liquid electrolyte solution includes $LiPF_6$, LiFSi, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $Li(CF_3SO_2)_2N$, and combinations thereof. These and other similar lithium salts may be dissolved in a variety of organic solvents, including, but not limited to, various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof. However, as discussed above, some lithium salts react with water, i.e., undergo hydrolysis, which results in the formation of hydrofluoric acid (HF). Such lithium salts include $LiPF_6$, LiFSi, $LiBF_4$, $LiAsF_6$, $LiCF_3SO_3$, $LiN(CF_3SO_2)_2$, $Li(CF_3SO_2)_2N$, and combinations thereof. When such salts are employed, it is desirable that ceramic HF scavengers are included in or on negative or positive electrodes 22, 24, as discussed further below.

The separator 26 operates as both an electrical insulator and a mechanical support. In one embodiment, a microporous polymeric separator 26 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 26. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 26 may also comprise other polymers in addition to the polyolefin, such as, but not limited to, polyethylene terephthalate (PET), polyvinylidene fluoride (PVDF), and/or a polyamide. Furthermore, the porous separator 26 may be mixed with a ceramic material or its surface may be coated in a ceramic material. For example, a ceramic coating may include alumina ($Al_2O_3$), silicon dioxide ($SiO_2$), titania ($TiO_2$), or combinations thereof.

Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such microporous polymer separators 30.

In alternative aspects, the porous separator 26 and the electrolyte 30 may be replaced with a solid-state electrolyte (SSE) (not shown) that functions as both an electrolyte and a separator, as are known in the art. The SSE may be disposed between the positive electrode 24 and negative electrode 22. The SSE facilitates transfer of lithium ions, while mechanically separating and providing electrical insulation between the negative and positive electrodes 22, 24. By way of non-limiting example, SSEs may include $LiTi_2(PO4)_3$, $LiGe_2(PO_4)_3$, $Li_7La_3Zr_2O_{12}$, $Li_{3x}La_{2/3-x}TiO_3$, $Li_3PO_4$, $Li_3N$, $Li_4GeS_4$, $Li_{10}GeP_2S_{12}$, $Li_2S-P_2S_5$, $Li_6PS_5Cl$, $Li_6PS_5Br$, $Li_6PS_5I$, $Li_3OCl$, $Li_{2.99}Ba_{0.005}ClO$, $Li_5La_3M_2O_{12}$, where M is niobium (Nb) or tantalum (Ta), $Li_2O-La_2O_3-M_2O_5$, where M is niobium (Nb) or tantalum (Ta), $LiAlTi(PO_4)_2$, or LISICON materials like $Li_{2+2x}Zn_{1-x}GeO_4$ or $Li_{(3+x)}Ge_xV_{(1-x)}O_4$, where x may be 0 and 1, and any combinations thereof by way of example. In certain variations, the SSE may selected from the group consisting of: $Li_5La_3M_2O_{12}$, where M is niobium (Nb) or tantalum (Ta), $Li_2O-La_2O_3-M_2O_5$, where M is niobium (Nb) or tantalum (Ta), $LiAlTi(PO_4)_2$, or LISICON materials like $Li_{2+2x}Zn_{1-x}GeO_4$ or $Li_{(3+x)}Ge_xV_{(1-x)}O_4$, where x may be 0 and 1, and combinations thereof.

The negative electrode 22 may be formed from a lithium host material that is capable of functioning as a negative terminal of a lithium-ion battery. The negative electrode 22 may thus include the electrode active material and, optionally, another electrically conductive material, as well as one or more polymeric binder materials to structurally hold the lithium host electroactive material particles together.

In certain variations, the negative electrode active material may comprise lithium, such as, for example, lithium metal. In certain variations, the negative electrode 22 is a film or layer formed of lithium metal or an alloy of lithium. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Thus, negative electroactive materials for the negative electrode 22 may be selected from the group consisting of: lithium, graphite, silicon, silicon-containing alloys, tin-containing alloys, and combinations thereof.

Such negative electrode active materials may be optionally intermingled with an electrically conductive material that provides an electron conduction path and/or at least one polymeric binder material that improves the structural integrity of the negative electrode 22. By way of non-limiting example, the negative electrode 22 may include an active material including electroactive material particles (e.g., graphite particles) intermingled with a polymeric binder material selected from the group consisting of polyvinylidene fluoride (PVDF), polytetrafluoroethylene (PTFE), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof, by way of example. Additional suitable electrically conductive materials may include carbon-based materials or a conductive polymer. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of conductive materials may be used.

A negative electrode may comprise the negative electrode active material present at greater than about 60 wt. % of the overall weight of the electrode, optionally greater than or equal to about 65 wt. %, optionally greater than or equal to about 70 wt. %, optionally greater than or equal to about 75 wt. %, optionally greater than or equal to about 80 wt. %, optionally greater than or equal to about 85 wt. %, optionally greater than or equal to about 90 wt. %, and in certain variations, optionally greater than or equal to about 95% of the overall weight of the electrode. The binder may be present at greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. % of the total weight of the electrode.

In certain variations, the negative electrode 22 includes the electrically-conductive material at less than or equal to about 20 wt. %, optionally less than or equal to about 15 wt. %, optionally less than or equal to about 10 wt. %, optionally less than or equal to about 5 wt. %, optionally less than or equal to about 1 wt. %, or optionally greater than or equal to about 0.5 wt. % to less than or equal to about 8 wt. % of the total weight of the negative electrode. While the electrically conductive materials may be described as powders, these materials can lose their powder-like character following incorporation into the electrode, where the associated particles of the supplemental electrically conductive materials become a component of the resulting electrode structure.

The negative electrode current collector 32 may be formed from copper (Cu) or any other appropriate electrically conductive material known to those of skill in the art.

The positive electrode 24 may be formed from a lithium-based active material that comprises a transition metal and that can sufficiently undergo lithium intercalation and deintercalation, or alloying and dealloying, while functioning as the positive terminal of the battery 20. In certain aspects, the inventive technology may be used in electrochemical cells employing an active material comprising a transition metal that suffer from capacity fade or other performance loss over time and while advantageous for use with active materials comprising manganese, in alternative aspects, the inventive technology may also be useful for active materials comprising other transition metals, such nickel and cobalt.

Therefore, in various aspects, the positive electrode comprises an active material having a transition metal. In certain variations, the transition metal may be selected from the group consisting of: manganese, nickel, cobalt, iron, and combinations thereof. In another variation, the transition metal may be selected from the group consisting of: manganese, nickel, cobalt, and combinations thereof. In certain variations, the transition metal comprises manganese.

As discussed above, manganese (Mn) dissolution has been considered as one of the main issues responsible for the capacity fading in lithium manganese oxide-based positive electrode materials. While not limiting the present teachings to any particular theory, it is theorized manganese (Mn) dissolution and deposition may occur in a conventional lithium-ion battery cell as shown via the theorized mechanisms described in J. Vetter et al., "Ageing mechanisms in lithium-ion batteries," J. Power Sources, Vol. 147, Nos. 1-2, pp. 269-281 (Sep. 9, 2005), incorporated herein by reference in its entirety. A positive electrode (like 24 in FIG. 1) comprises an exemplary lithium manganese oxide material (lithium manganese spinel, $LiMn_2O_4$) electroactive material. Manganese ions may be formed from the electroactive material by the reaction $LiMn_2O_4 \rightarrow [Li_xMn_{2-x}]O_4 + Mn^{2+}$, where $0<x<1$. At low potentials, a disproportionation reaction may generate manganese ions by a reaction where $2Mn^{3+} \rightarrow Mn^{4+} + Mn^{2+}$. Furthermore, an electrolyte may comprise fluorine compounds, such as $LiPF_6$, which may potentially degrade and react. For example, $LiPF_6$ reacts with water ($H_2O$) to form hydrofluoric acid (HF) in addition to lithium fluoride (LiF) and phosphoric acid ($H_3PO_4$). The hydrofluoric acid (HF) may migrate near or within the positive electrode. Thus, a reaction may occur where acid dissolution of $Li_{1-x}Mn_2O_4$ may occur, where $Li_{1-x}Mn_2O_4 + HF \rightarrow \lambda\text{-}MnO_2 + LiF + Mn^{2+} + H_2O$. Thus, multiple reactions at the positive electrode each create potentially undesirably generate $Mn^{2+}$ ions.

During operation of the electrochemical cell, the $Mn^{2+}$ ions may re-precipitate within or at the positive electrode as different species, including $Mn_xO_y$, $MnF_2$, $MnCO_3$, and the like. Alternatively, the $Mn^{2+}$ ions may migrate through the electrolyte (and through a separator like 26 in FIG. 1) to the negative electrode (e.g., negative electrode 22 in FIG. 1). At the negative electrode, the manganese metal may deposit on a surface via a reduction reaction, for example. When the manganese is deposited on the negative electrode, it may damage the solid electrolyte interface layer and block lithium ion intercalation into the negative electrode. Thus, capacity fading in manganese-containing materials can be attributed at least in part to deposited manganese on negative electrodes that comprise graphite or other negative electrode materials, which catalyzes electrolyte decomposition. Further, the degradation of the positive electrode electroactive material potentially results in material loss and capacity fading. Thus, incorporating ceramic HF scavengers as coatings or components of electrodes is believed to minimize formation of HF and transition metal dissolution. The dry powder processing methods of such ceramic particles with transition metal based electroactive material particles in accordance with the present disclosure can minimize or prevent transition metal dissolution and enhance long-term performance of the electrochemical cell.

One common class of known electroactive materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$), or a lithium nickel cobalt metal oxide ($LiNi_{(1-x-y)}Co_xM_yO_2$, where $0<x<0.2$, $y<0.2$, and M may be Al, Mg, Ti, or the like). In certain variations, the transition metal is manganese (Mn) and the electroactive material is selected from the group consisting of: lithium manganese oxide ($Li_{(1+x)}Mn_{(2-x)}O_4$), where $0<x<1$ (LMO), lithium manganese nickel oxide ($LiMn_{(2-x)}Ni_xO_4$), where $0 \leq x \leq 1$ (LMNO), lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (NMC), $Li[Ni_{0.89}Co_{0.05}Mn_{0.05}Al_{0.01}]O_2$ (NCMA), Ni-rich NCMA, other doped NMC materials, and combinations thereof. The present technology is particularly advantageous for use with lithium manganese oxide based positive electrode active materials, such as spinel $LiMn_2O_4$, $LiMn_{0.33}Ni_{0.33}Co_{0.33}O_2$, $LiMn_{1.5}Ni_{0.5}O_4$, and other Li-rich manganese oxide materials. As will be appreciated by those of skill in the art, some of these manganese-containing electroactive materials also comprise cobalt or nickel. In alternative aspects, the positive electrode 24 may comprise an active material having a transition metal like iron, such as lithium iron polyanion oxide with an olivine structure, such as lithium iron phosphate ($LiFePO_4$), lithium manganese-iron phosphate ($LiMn_{2-x}Fe_xPO_4$, where $0<x<0.3$), or lithium iron fluorophosphates ($Li_2FePO_4F$). Further, where appropriate, the positive electrode active material may be doped (for example, by magnesium (Mg)).

The positive electrode active materials may be powder compositions. The positive electrode active materials may be intermingled with an optional electrically conductive material (e.g., electrically conductive particles) and a polymeric binder. The binder may both hold together the positive electrode electroactive material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, or combinations thereof.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, carbon nanotubes, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

A positive electrode may comprise the positive electrode active material present at greater than about 60 wt. % of the overall weight of the electrode, optionally greater than or equal to about 65 wt. %, optionally greater than or equal to about 70 wt. %, optionally greater than or equal to about 75 wt. %, optionally greater than or equal to about 80 wt. %, optionally greater than or equal to about 85 wt. %, optionally greater than or equal to about 90 wt. %, and in certain variations, optionally greater than or equal to about 95% of the overall weight of the electrode. The binder may be present at greater than or equal to about 1 wt. % to less than or equal to about 20 wt. %, optionally greater than or equal to about 1 wt. % to less than or equal to about 15 wt. %, optionally greater than or equal to about 1 wt. % to less than or equal to about 10 wt. %, optionally greater than or equal to about 1 wt. % to less than or equal to about 5 wt. %, or optionally greater than or equal to about 1 wt. % to less than or equal to about 3 wt. % of the total weight of the electrode.

In certain variations, the positive electrode 24 includes the electrically-conductive material at less than or equal to about 20 wt. %, optionally less than or equal to about 10 wt. %, optionally less than or equal to about 5 wt. %, optionally less than or equal to about 3 wt. %, optionally greater than or equal to about 1 wt. % to less than or equal to about 20 wt. % of the total weight of the positive electrode, optionally greater than or equal to about 1 wt. % to less than or equal to about 10 wt. % of the total weight of the positive electrode, or optionally greater than or equal to about 0.5 wt. % to less than or equal to about 8 wt. % of the total weight of the positive electrode. While the electrically conductive materials may be described as powders, these materials can lose their powder-like character following incorporation into the electrode, where the associated particles of the supplemental electrically conductive materials become a component of the resulting electrode structure.

As discussed above, some liquid electrolytes are capable of reacting with water to form HF, especially at elevated temperatures. With cooling systems in place, the battery 20 typically operates within a normal temperature that is less than or equal to about 40° C., such as within a range of greater than or equal to about 25° C. to less than about 40° C. As used herein, "elevated temperatures" are temperatures that are greater than or equal to about 40° C., such as within a range of greater than or equal to about 40° C. to less than or equal to about 60° C. As discussed above, certain lithium-containing liquid electrolytes may hydrolyze to form HF at elevated temperatures, which may include $LiPF_6$, LiFSi, $LiBF_4$, $LiAsF_6$, $LiCF_3SO_3$, $LiN(CF_3SO_2)_2$, $Li(CF_3SO_2)_2N$, and combinations thereof, as non-limiting examples.

Accordingly, the present disclosure contemplates an electrode comprising an electrode active material and a ceramic HF scavenger, wherein the ceramic HF scavenger comprises $M_2SiO_3$, $MAlO_2$, $M_2O$—$Al_2O_3$—$SiO_2$, $Al_2O_3$, $SiO_2$, $ZrO_2$, MgO, $Nb_2O_5$, where M is Li, Na, or combinations thereof. In certain variations, the ceramic HF scavenger comprises $M_2SiO_3$, $MAlO_2$, $M_2O$—$Al_2O_3$—$SiO_2$, or combinations thereof, where M is Li, Na. In certain variations, such ceramic materials may be formed from a zeolite and thus referred to herein as a Li-zeolite. Therefore, for batteries that cycle lithium ions, the ceramic HF scavenger comprises $Li_2SiO_3$, $LiAlO_2$, $Li_2O$—$Al_2O_3$—$SiO_2$, or combinations thereof, and for batteries that cycle sodium ions, the ceramic HF scavenger comprises $Na_2SiO_3$, $NaAlO_2$, $Na_2O$—$Al_2O_3$—$SiO_2$, or combinations thereof. The ceramic HF scavenger (or combination of scavengers) traps protons, for example, from HF, without forming hydrates that can be released at elevated temperatures. More particularly, for example, $Li_2SiO_3$ reacts with HF to form $LiHAl_2O_4$, which does not include a releasable water molecule. Similarly, $LiAlO_2$ reacts with HF to form $LixH_{4-x}SiO_4$ ($0 \leq x < 4$), which does not include a releasable water molecule, and $Li_2O$—$Al_2O_3$—$SiO_2$, reacts with HF to form $Li_xH_{7-x}SiAlO_7$ ($0 \leq x < 7$), which does not include a releasable water molecule. The ceramic HF scavenger is embedded into a positive electrode, i.e., within a positive electrode active material, or included in an electrode coating for a positive electrode or, in certain embodiments discussed further below, for a negative electrode.

Methods of preparing the ceramic HF scavengers are described in commonly owned U.S. patent application Ser. No. 16/445,610 filed on Jun. 19, 2019 entitled "CERAMIC COATED SEPARATORS FOR LITHIUM CONTAINING ELECTROCHEMICAL CELLS AND METHODS OF MAKING THE SAME" and U.S. patent application Ser. No. 16/573,605 filed on Sep. 17, 2019, entitled "ELECTRODE ADDITIVES AND COATINGS FOR MINIMIZING CATHODE TRANSITION METAL DISSOLUTION," the relevant portions of which are both incorporated herein by reference in its entirety. However, as will be discussed further below, the methods of making an electrode with such ceramic HF scavengers involved conventional processes, such as conventional powder mixing and liquid solvent based casting.

In certain variations, the positive electrode 24 includes the ceramic HF scavenging material at less than or equal to about 20 wt. %, optionally less than or equal to about 15 wt. %, optionally less than or equal to about 10 wt. %, optionally less than or equal to about 5 wt. %, optionally less than or equal to about 3 wt. %, optionally greater than or equal to about 1 wt. % to less than or equal to about 20 wt. % of ceramic HF scavenging material by the total weight of the positive electrode. In alternative variations, for example, where the electroactive material does not contain manganese or other potentially unstable transition metals, the ceramic material may be a traditional ceramic, such as alumina ($Al_2O_3$), silicon dioxide ($SiO_2$), and/or titania ($TiO_2$).

The positive electrode current collector 34 may be formed from aluminum (Al) or any other appropriate electrically conductive material known to those of skill in the art.

In certain aspects, the present disclosure provides a method of making a component for an electrochemical cell, such as an electrode. The method includes processing a particle mixture or mixture of powderized precursors in a multistep solvent-free dry process. The particle mixture has at least two distinct precursors, but as described herein, in certain variations has three distinct powder particles. In certain variations, the precursors may include a plurality of first particles, a plurality of second particles, and a plurality of third particles. The particles (e.g., first, second, and third particles) differ in composition and/or average particle size from one another. In certain variations, the plurality of first particles and the plurality of second particles may be inorganic particles. By "inorganic particle" it is meant that the precursor particle comprises an inorganic material, although may also have a coating with an organic material in alternative aspects. The third particles may be an organic particle comprising carbon.

In certain aspects, the plurality of first inorganic particles comprises an electroactive material. For example, the plurality of first particles may comprise a positive electroactive material, such as an inorganic electroactive material. Where the electroactive material is a negative electroactive material, the first particle may be inorganic or organic. The plurality of second particles may comprise a ceramic material, such as the ceramic HF scavenging particles or solid-state electrolytes described above. In other aspects, the plurality of second particles may comprise a solid-state electrolyte. The plurality of third particles may comprise a carbon-containing material, such as the electrically conductive carbon-containing particles described above in the context of the negative and positive electrodes, including electrically conductive carbons, such as carbon black, acetylene black, or carbon nanotubes, and the like.

In certain aspects, the first particles have a first average diameter ($D_1$) greater than a second average diameter ($D_2$) of the second particles and/or a third average diameter ($D_3$) of the third particles. In certain aspects, the first average diameter ($D_1$) of the first particle is greater than or equal to about 10 times the second average diameter ($D_2$) of the second particle and/or the third average diameter ($D_3$) of the third particle. For example, the first average diameter ($D_1$) of the first particle may be greater than or equal to about 1 μm to less than or equal to about 100 μm and optionally greater than or equal to about 5 μm to less than or equal to about 25 μm. The second average diameter ($D_2$) of the second particle may be greater than or equal to about 100 nm to less than or equal to about 5 μm, optionally greater than or equal to about 1 μm to less than or equal to about 5 μm in certain variations. The third average diameter ($D_3$) of the third particle may be greater than or equal to about 50 nm to less than or equal to about 50 μm, optionally greater than or equal to about 50 nm to less than or equal to about 5 and optionally greater than or equal to about 50 nm to less than or equal to about 100 nm in certain variations.

The particle mixture may be subjected to an initial dry process where the respective particles are subjected to compression and shear mixing. This process can form a plurality of coated particles that can be further treated. The compression and shear mixing can be conducted in a dry-coating device or reactor. In certain variations, the particle mixture introduced into the dry-coating device or reactor may comprise a plurality of first particles, a plurality of second particles, and a plurality of third particles. In other variations, the initial particle mixture may comprise a plurality of first particles and a plurality of second particles, while a plurality of third particles may be later introduced into the dry-coating device or reactor to form a multilayered coating.

Figures 2A, 2B, 2C:
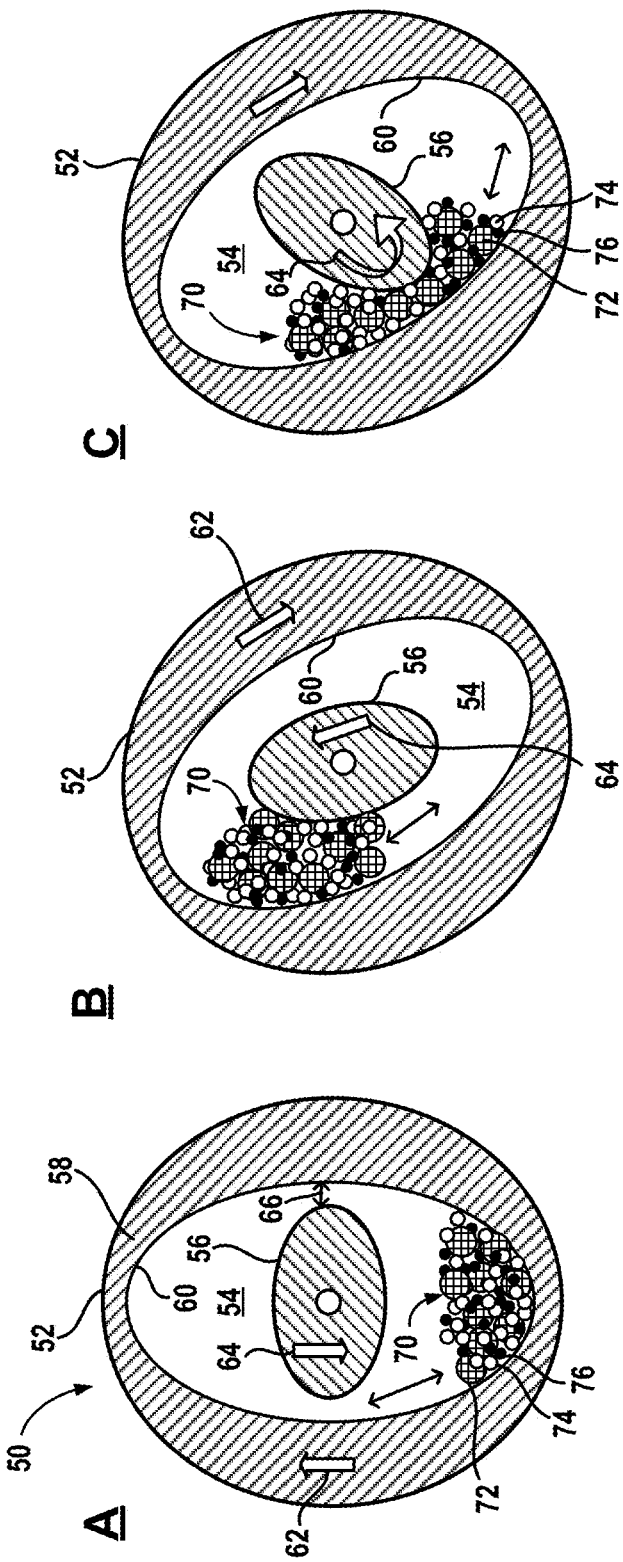
FIGS. 2A-2C are schematic illustrations of a process for forming a coated electroactive material using a dry-powder process in a dry-coating device according to certain aspects of the present disclosure.

FIGS. 2A-2C illustrate a dry-coating method (e.g., solvent-free process) for conducting the first step of the dry coating methods of the present disclosure. A dry-coating device 50 includes a rotatable vessel 52 defining a cavity 54 with a rotor 56 disposed within the cavity 54. One suitable dry-coating device is commercially available as a Theta Composer® sold by Tokuju Corp. of Kanagawa, Japan. The rotatable vessel 52 includes an outer body portion 58 that defines a wall 60 of the cavity 54. As will be described further below, the rotatable vessel 52 rotates in a first direction 62, while the rotor 56 rotates in a second direction 64 opposite to the first direction 62.

A particle mixture 70 is introduced and disposed within the cavity 54, as shown in FIG. 2A. The particle mixture has at least two distinct types of particles, but as discussed above, in certain variations will have at least three distinct types of particles. In FIGS. 2A-2C, the particle mixture 70 includes a plurality of first particles 72 (e.g., electroactive material particles), a plurality of second particles 74 (e.g., ceramic particles), and a plurality of third particles 76 (e.g., carbon black). Notably, although the average particle size diameter of the first particle 72 is greater than that of either the second particle 74 or the third particle 76, the size of the respective particles shown in the particle mixture 70 is not necessarily to scale.

The internal cavity 54 of the rotatable vessel 52 and the rotor 56 may each have an elliptical cross-sectional shape. The rotatable vessel 52 is rotatable at a first speed in the first direction 62. The rotor 56 is rotatable at a second speed in the second direction 64. The rotation speed of the rotor 56 (e.g., the second speed) is greater than the rotation speed of the rotatable vessel 52 (e.g., first speed). The rotatable vessel 52, thus, rotates at a slow speed in the first direction 62 and the rotor 56 rotates at a high speed in the second direction 64. For example, the first speed may be greater than or equal to about 45 rpm to less than or equal to about 125 rpm, optionally greater than or equal to about 45 rpm to less than or equal to about 80 rpm, for example, about 75 rpm. The second speed may be greater than or equal to about 1,000 rpm to less than or equal to about 10,000 rpm, optionally greater than or equal to about 1,000 rpm to less than or equal to about 5,000 rpm, optionally greater than or equal to about 1,000 rpm to less than or equal to about 3,000 rpm, for example, about 2,000 rpm.

As illustrated in FIG. 2A, as the rotatable vessel 52 and rotor 56 rotate, a minimum clearance is defined between the rotor 36 and the cavity 54 walls 60 of the vessel 52 when they are at the closest point during their respective paths of travel. The clearance 66 between the rotor 56 and the rotatable vessel 52 is dependent on the relative size of the cavity 54 and the rotor 56 disposed therein and may be varied to produce the desired coating on the first particles. For example, in various aspects, the minimum clearance 66 between the rotor 56 and the wall 60 of the rotatable vessel 52 may be defined by the diameters ($D_1$), ($D_2$), ($D_3$) of the first, second, and third particles 72, 74, 76. The minimum clearance 66 may be equal to or greater than the first average diameter ($D_1$) of the first particle 72 plus two times the second average diameter ($D_2$) of the second particle 74 and/or two times the third average diameter ($D_3$) of the third particle 76. Thus, the minimum clearance 66 ("C") may be equal to or greater than $D_1+2D_2$, so that $C \geq D_1+2D_2$ or greater than $D_1+2D_3$, so that $C \geq D_1+2D_3$, or $C \geq D_1+2D_2+2D_3$. In various aspects, the clearance 66 may be greater than or equal to about 0.025 mm and less than or equal to about 1 mm.

In various aspects, the particle mixture 70 is introduced into the cavity 54 of the rotatable vessel 52. The amounts of the respective particles in the particle mixture may correspond to the amounts desired in the final electrode product. The particle mixture 70 may include greater than or equal to about 30 weight percent to less than or equal to about 98 weight percent of the first particle 72, optionally greater than or equal to about 80 weight percent to less than or equal to about 98 weight percent of the first particle 72, greater than or equal to about 0.1 weight percent to less than or equal to about 30 weight percent of the second particle 74, and greater than or equal to about 0.1 weight percent to less than or equal to about 30 weight percent of the third particle 76.

As shown in FIG. 2B, the rotatable vessel 52 and rotor 56 are respectively activated to rotate and blend the first, second, and third particles 72, 74, and 76. The rotatable vessel 52 is rotated at the first speed in the first direction 62 and the rotor 56 is rotated at the second speed in the second direction 64. The rotatable vessel 52 and rotor 56 may be rotated for a predetermined time of greater than or equal to about 5 minutes to less than or equal to about 300 minutes, optionally greater than or equal to about 5 minutes to less than or equal to about 120 minutes. Further, the particle mixture may be subjected to two or more distinct process cycles. Thus, a first cycle may last for about 15 to about 30 minutes, followed by a second cycle that also lasts for about 15 to about 30 minutes until a proper mixing result is observed. In one variation, in each of two cycles that last 30 minutes, the rotatable vessel 52 is rotated at the first speed in the first direction 62 at greater than or equal to about 45 rpm to less than or equal to about 125 rpm, for example, about 75 rpm in one variation, and the rotor 56 is rotated at the second speed in the second direction 64 at a speed of greater than or equal to about 1,000 rpm to less than or equal to about 3,000 rpm, for example, about 2,000 rpm. As will be appreciated by those of skill in the art, mixing times can be adjusted based on using different coating materials and preventing potential unexpected over-processing behaviors, such as generating heat over time and the particle degradation/particle break down of first particle As illustrated in FIG. 2C, thrusting and compression forces at the clearance 66 or pinch point can cause dispersion of the first, second, and third particles 72, 74, and 76 in the particle mixture 70. The beginning of this process in shown in FIG. 2C, but the longer the processing times, the greater the extent of coating that occurs. The second and third particles 74, 76 having smaller average diameters ($D_2$, $D_3$) than the first particles 72 may be especially susceptible to the thrusting and compression forces. In various instances, the second and third particles 74, 76 may be disposed on the exposed surfaces of the first particle 72 to form a coating in a uniform fashion by the rotation of the rotatable vessel 52 and rotor 56. For example only, in certain instances, a portion of a plurality of the second particles 74 (e.g., ceramic particles) and a portion of the plurality of the third particles 76 (e.g., carbon-containing particles) may be uniformly disposed on one or more exposed surfaces of each of the first particles 23. The processing in the dry-coating device 50 promotes even mixing of the various particles in the particle mixture 70.

In certain variations, where the particle mixture comprises the first particle, the second particle, and the third particle, such that the second and third particles are added together during the mixing process, a hybrid or composite coating may be formed where the second and third particles are interspersed with one another in the coating. In certain aspects, the formation of a hybrid coating depends on different physical properties of particles involved. For example, the first particle (e.g., active material) has the largest particle size and may have the strongest mechanical strength, so the aggregates of second particles (e.g., ceramic coating material) and aggregates of third particles (e.g., carbon-containing additives) are gradually broken down during the mixing and coated onto the dominant first particle. Within this mixing with shear force, many physical properties may make a difference to the resulting coating formed, and could form either a hybrid coating or in some cases, a multilayered coating, depending on the mechanical strength differences of the second and third particle aggregates, the volume ratio and densities of different particles, and the particle-particle bonding relationship between particles (for example, bonding between first-second particles, second-third particle, and third-first particles). Therefore, the resulting coating can differ depending on different types of precursors or raw materials, so that while a hybrid or composite coating is most likely to result, in certain variations, a bilayer coating may also be formed.

Further, in embodiments where the initial particle mixture comprises a plurality of first particles and a plurality of second particles that are processed to form an initial first coating, a plurality of third particles may be subsequently introduced into the dry-coating device or reactor to form a second coating over the first coating, and thus a multilayered coating.

Notably, in certain variations, the coating may form a bilayer coating, where a first layer of the coating on the surface of the first particle 72 predominantly comprises second particles 74, while a second layer of the coating is disposed over the first layer and comprises the third particles 76. In other variations, the rotation of the rotatable vessel 52 and rotor 56 may exfoliate or remove portions of the material from either the second particles 74 or the third particles 76. For example, where the third particle 76 is a carbon-containing material, such as carbon black, exfoliated or removed portions may shed during the rotation. Thus, the exfoliated or removed portions may have a thickness less than or equal to the clearance 66. The exfoliated or removed portions may be disposed onto one or more exposed surfaces of the first particle 72 to form the coating. The layer of exfoliated or removed material may wrap over and fuse with portions of the exposed surface of the first particle 72. The rotor 56 and rotatable vessel 52 may comprise materials capable of sustaining the high shear and compaction forces. For example, the rotor 56 may comprise zirconia ($ZrO_2$) and the wall 60 of the rotatable vessel 52 may comprise stainless steel that is surface treated to enhance hardness, for example, with nitride ($N^{3-}$) treatment.

Figure 3A:
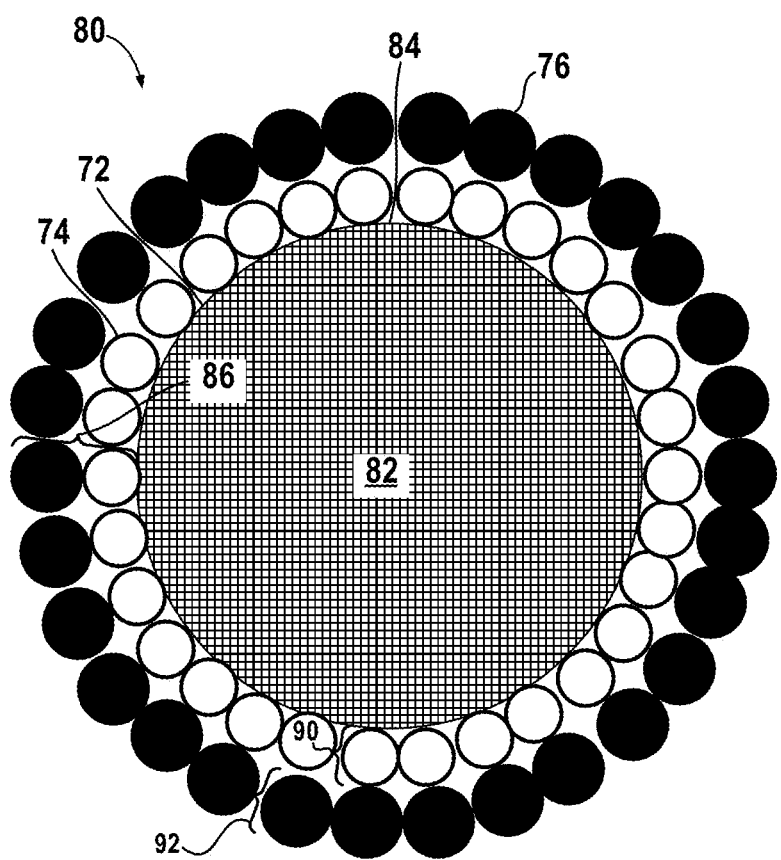
FIGS. 3A-3B are cross-sectional view of an intermediate dry-coated electroactive material particle product formed in an initial dry coating process according to certain methods of the present disclosure.

FIG. 3A shows a representative and simplified depiction of an intermediate product formed by certain methods provided by the present disclosure, namely a multilayered coated particle 80 formed after processing in the dry-coating device 50. More specifically, a multilayered coated particle 80 may be formed by certain methods of the present disclosure, where the initial particle mixture initially introduced to the dry-coating device comprises the plurality of first particles and the plurality of second particles. The plurality of coated particles formed during the initial mixing process in the dry-coating device each has a first surface coating comprising the plurality of second inorganic particles disposed over the core region defined by each first particle. The method further includes subsequently adding a plurality of third particles with the plurality of coated particles having the first surface coating in the dry-coating device and further rotating the rotatable vessel at the first speed in the first direction and rotating the rotor at the second speed in the second direction. In this manner, a second coating comprising the plurality of third particles is formed over the first coating, so that the surface coating is multilayered.

Thus, with renewed reference to FIG. 3A, the first particle 72 defines a core region 82 and a surface 84. A coating 86 is formed over the surface 84 of the core region 82. The coating 86 is a bilayer structure that includes a first layer 90 and a second layer 92. The first layer 90 comprises a plurality of the second particles 74. The second layer 92 comprises a plurality of the third particles 76. As will be appreciated by those of skill in the art, FIG. 3A is a simplified depiction and the first layer 90 may in fact have multiple layers of the second particles 74 and the second layer 92 may have multiple layers of the third particles 76.

In certain variations, the coating 86 is a substantially uniform coating and may cover greater than or equal to about 70% of the one or more exposed surfaces 84 of the first particle 72, optionally greater than or equal to about 75%, optionally greater than or equal to about 80%, optionally greater than or equal to about 85%, optionally greater than or equal to about 90%, and in certain variations, optionally greater than or equal to about 95% of the exposed surface area of the surface 84 of the core region 82. The substantially uniform coating 86 comprising the first layer 90 of the second particles 74 and the second layer 92 of the third particles 76 may have a thickness of greater than or equal to about 50 nm to less than or equal to about 10 µm, optionally greater than or equal to about 100 nm to less than or equal to about 5 µm, and in certain variations, optionally about 1 µm. The thickness of the first coating 90 is generally determined by the average particle size of the second particles 74 and may be greater than or equal to about 1 µm to less than or equal to about 2 µm, by way of non-limiting example. Likewise, the thickness of the second coating 92 is generally determined by the average particle size of the third particles 76 and may be greater than or equal to about 100 nm to less than or equal to about 500 nm, by way of non-limiting example.

Figure 3B:
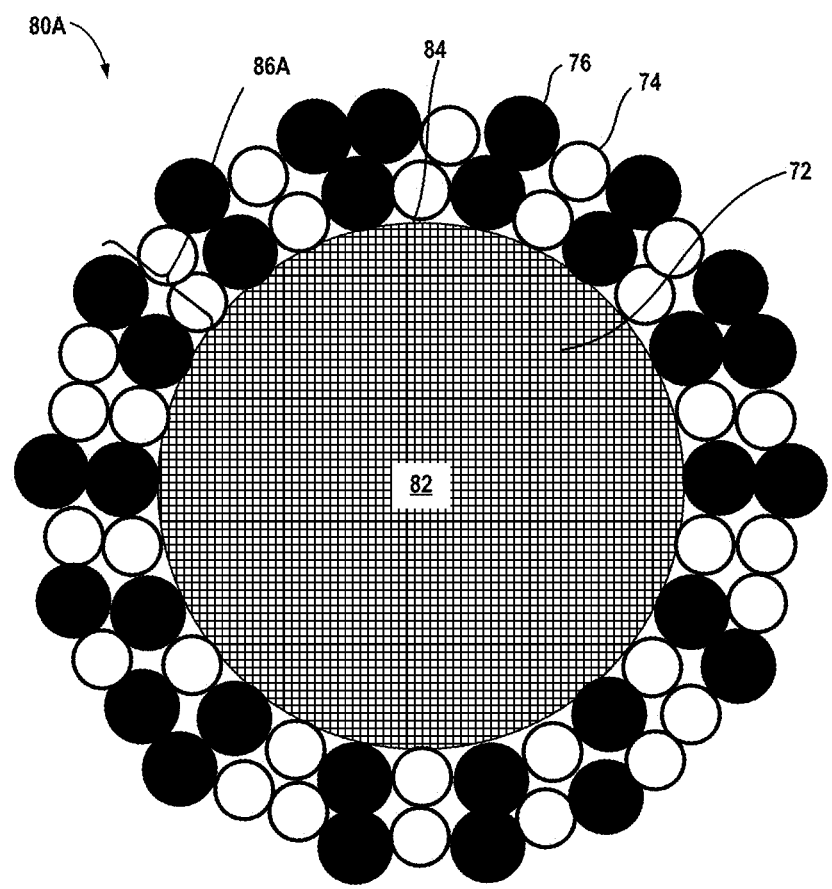

FIG. 3B shows a representative and simplified depiction of an intermediate product formed by certain other methods provided by the present disclosure, namely a hybrid or composite coated particle 80A formed after processing in the dry-coating device 50, as described above. For example, the hybrid or composite coated particles 80A may be formed by a method where the particle mixture introduced to the dry-coating device comprises a plurality of first particles, a plurality of second particles, and a plurality of third particles, so that the surface coating comprises the portion of the plurality of the second inorganic particles and further comprises a portion of the plurality of the third particles. Thus, the surface coating may be a composite or hybrid coating with both the second and third particles distributed therein.

In FIG. 3B, the first particle 72 thus defines a core region 82 having a surface 84. A coating 86A is formed over the surface 84 of the core region 82. The coating 86A includes a combination of a plurality of second particles 74 and a plurality of third particles 76. As will be appreciated by those of skill in the art, FIG. 3B is a simplified depiction and the second particles and third particles 76 may be homogenously distributed within the coating 86A or alternatively may form a gradient where a concentration of the second particles 74 is higher near the surface 84 of the core region 82 (so that the third particle 76 concentration is lower near the surface 84) and lower near an exposed surface of the coating 86A (where the third particle concentration 84 is higher) or vice versa.

In certain variations, like coating 86 in FIG. 3A, the coating 86A in FIG. 3B may be a substantially uniform coating that may cover greater than or equal to about 70% of the one or more exposed surfaces 84 of the first particle 72, optionally greater than or equal to about 75%, optionally greater than or equal to about 80%, optionally greater than or equal to about 85%, optionally greater than or equal to about 90%, and in certain variations, optionally greater than or equal to about 95% of the exposed surface area of the surface 84 of the core region 82. The substantially uniform coating 86A comprising the second particles 74 and the third particles 76 may have a thickness of greater than or equal to about 1 µm to less than or equal to about 10 µm, optionally greater than or equal to about 1 µm to less than or equal to about 5 and in certain variations, optionally greater than or equal to about 1 µm to less than or equal to about 2 µm. As will be appreciated, if the average particles sizes of the second particles 74 and third particles 76 are reduced to a nanometer scale below 1 µm, for example, a corresponding thickness of the coating 86A may be smaller, for example, also in the nanometer scale.

The methods of making a component for an electrochemical cell according to certain aspects of the present disclosure further include mixing the plurality of coated particles (e.g., like coated particle 80) formed in the compression and shearing process conducted in a dry-coating device with a plurality of polymeric particles in a subsequent dry mixing process. The process involves concurrent planetary and centrifugal mixing, so that the particles are subjected to both rotation and revolution during mixing. The plurality of coated particles and the plurality of polymeric particles can be added to a planetary and centrifugal mixer that rotates about a first axis and revolves about a second axis. In this process, a portion of the plurality of polymeric particles surrounds each of the plurality of coated particles.

Figure 4:
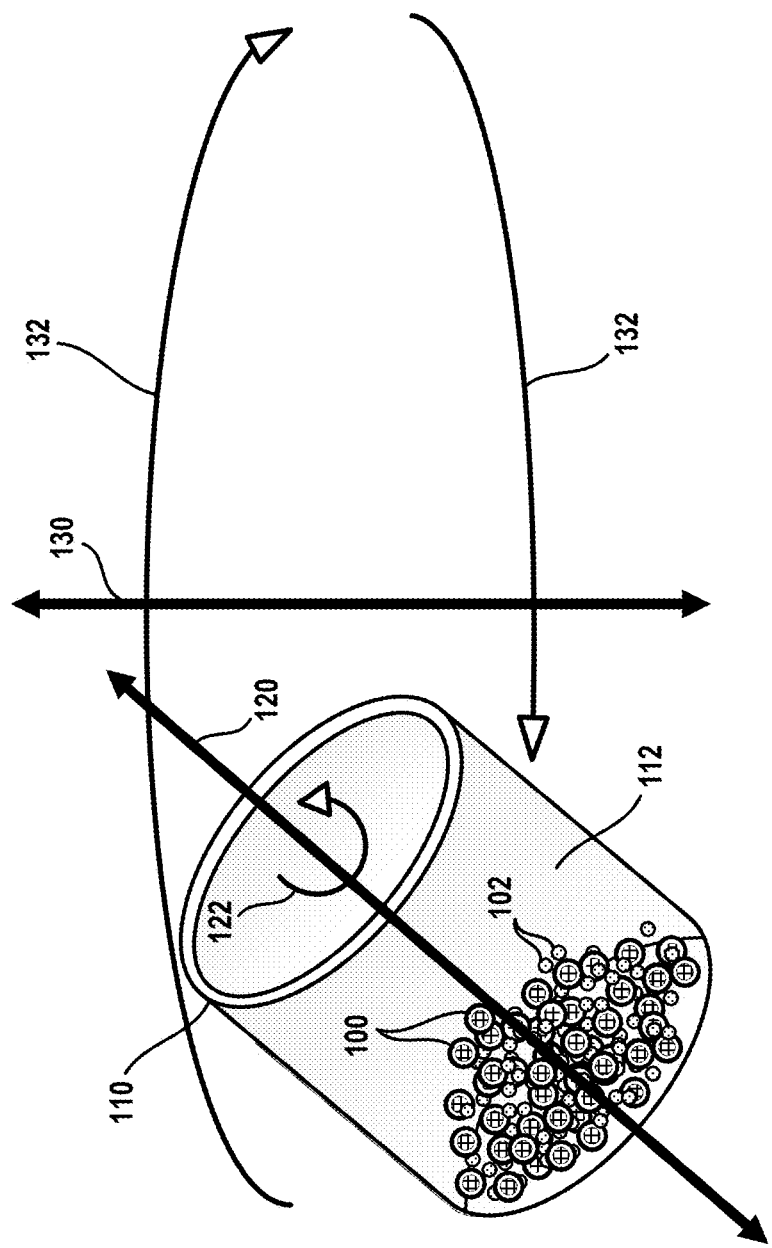
FIG. 4 shows a planetary and centrifugal mixer used in a process to mix a plurality of polymeric binder particles with a plurality of coated electroactive materials like that shown in FIG. 3 in accordance with certain aspects of the present disclosure.

As shown in FIG. 4, a plurality of coated particles 100 and a plurality of polymeric particles 102 are added to a receptacle 110 of a planetary and centrifugal mixer 112 that rotates about a first axis and revolves about a second axis. The planetary and centrifugal mixer 112 rotates about a first axis 120 as shown by the movement of arrow 122 and revolves about a second axis 130, as shown by the movement of arrows 132. The first axis 120 is a centrally disposed axis defined through a center of the planetary and centrifugal mixer 112. The second axis 130 is disposed external to the planetary and centrifugal mixer 112. Thus, the planetary and centrifugal mixer 112 rotates about the first axis 120 that is an internal axis, while it revolves around the second axis 130 that is an external axis. Such a planetary and centrifugal mixer is available as a Thinky™ mixer from Thinky U.S.A., Inc. Notably, the amount of friction and heat, as well as lower shear stress as compared to the dry-coating mixing device discussed above is believed to be advantageous. For example, the friction generated by the planetary and centrifugal mixing is diminished and therefore heat generated is more limited and particularly suitable for polymeric particles, such as polymeric binder, that have a relatively low melting point. In this manner, the planetary and centrifugal mixing can avoid softening or melting of the polymeric material, but serves to associate the plurality of polymeric particles with each coated particle, so that the polymeric material particles surround each of the plurality of coated particles. Notably, during further processing with heat and/or pressure, the polymeric particles may be softened or melted to create a matrix of continuous polymeric material with the coated particles distributed therein. Further, conducting the second mixing step in a planetary and centrifugal mixer is believed to better protect the self-assembling of active material and ceramic (e.g., LMO/Li-Zeolite) and thus better protect the particle integrity of the electroactive material (e.g., LMO). Further, mixing in a centrifugal and planetary mixer appears to better disperse polymeric/binder materials, introduce less electrostatic effect and less binder melting, shorten the mixing time and enhance release of the processing heat.

In certain aspects, the polymeric particles 102 may have a fourth average diameter ($D_4$) that is less than an average diameter of the coated particles. For example, the fourth average diameter ($D_4$) of the polymeric particle may be greater than or equal to about less than or equal to about 10 nm to less than or equal to about 100 nm, for example, optionally greater than or equal to about less than or equal to about 10 nm to less than or equal to about 20 nm. However, certain solid particles of polymeric binder may agglomerate or form aggregates, which may have an average particle size of greater than or equal to about less than or equal to about 1 µm to less than or equal to about 10 µm, by way of example. The vigorous mixing that occurs in the planetary and centrifugal mixer helps to break up the aggregated particles, which helps to better disperse them onto the coated particles and thus to create a thin coating of the polymeric binder that otherwise would not be possible (e.g., with conventional casting processes).

The planetary and centrifugal mixer 112 rotates at a first speed in a first direction 122 around the first axis 120. For example, the first speed may be greater than or equal to about 100 rpm to less than or equal to about 1,000 rpm, or optionally greater than or equal to about 750 rpm to less than or equal to about 900 rpm, for example, about 880 rpm. The planetary and centrifugal mixer 112 also revolves around the second axis 130 at a second speed. The second speed may be greater than or equal to about 100 rpm to less than or equal to about 1,000 rpm, or optionally greater than or equal to about 750 rpm to less than or equal to about 900 rpm, for example, about 880 rpm.

The planetary and centrifugal mixer 112 rotates and revolves to mix the plurality of coated particles 100 and the plurality of polymeric particles 102 together. The planetary and centrifugal mixer 112 is rotated at the first speed and revolved at the second speed for a predetermined time of greater than or equal to about 30 seconds to less than or equal to about 15 minutes, optionally greater than or equal to about 1 minute to less than or equal to about 10 minutes, optionally greater than or equal to about 1 minute to less than or equal to about 5 minutes, and optionally greater than or equal to about 2 minute to less than or equal to about 4 minutes, for example, about 3 minutes. Further, the particle mixture may be subjected to two or more distinct process cycles. In certain aspects, four distinct cycles of mixing are conducted, where each cycle lasts the amount of time specified above. Each of the four distinct cycles may last greater than or equal to about 1 minute to less than or equal to about 5 minutes. In one variation, in each of the four cycles that lasts about 3 minutes, the planetary and centrifugal mixer 112 is rotated at the first speed at about 880 rpm and revolved at the second speed of about 880 rpm. Such a mixing process results in a plurality of polymeric particles surrounding each of the plurality of coated particles.

In certain variations, the polymeric particles surrounding each of the plurality of coated particles can be used to form a battery component, such as an electrode (positive or negative) or a separator. In other variations, the processes can be used for mixing solid-state electrolyte particles as well, which may be introduced into electrodes or form the solid-state electrolyte component between electrodes. As noted above, further treatment with heat and pressure can consolidate the coated materials to form a polymeric matrix in which the particles are distributed. Advantageously, the plurality of particles may be substantially homogenously distributed through the matrix.

In certain variations, the present disclosure contemplates a method of making an electrode for an electrochemical cell without solvents. The processes described above are conducted, so that a particle mixture comprising a plurality of first particles comprising an electroactive material is formed. The electrode comprising the electroactive material can be either a positive electrode (i.e., cathode in an electrochemical cell) active material or a negative electrode (i.e., anode in an electrochemical cell) active material. The particle mixture also includes a plurality of second particles comprising a ceramic material, like the ceramic HF scavengers described above. In other variations, the plurality of second particles may comprise a solid-state electrolyte, such as those described above. Further, a plurality of third particles comprising a carbon-containing material are mixed in the dry-coating device. The dry-coating device comprises a rotatable vessel defining a cavity with a rotor disposed within the cavity, so that the rotatable vessel is rotated at a first speed in a first direction and the rotor is rotated at a second speed greater than the first speed in a second direction opposite to the first direction so as to create a plurality of coated particles. Each of the coated particles has a surface coating disposed over a core region. The core region comprises one of the first particles comprising an electroactive material, while the surface coating comprises a portion of the plurality of the second particles (e.g., comprising a ceramic material or solid-state electrolyte) and a portion of the plurality of the third particles comprising a carbon-containing material.

Next, the plurality of coated particles are mixed with a plurality of binder particles in a planetary and centrifugal mixer that rotates about a first internal axis and revolves about a second external axis to form a mixture in which a portion of the plurality of binder particles surrounds each of the plurality of coated particles.

Then, the mixture of coated particles is collected and dry sprayed onto a current collector. The mixture of coated particles on the current collector may be consolidated by the applying of heat and/or pressure to form a porous electrode comprising the plurality of first particles comprising an electroactive material having a coating comprising a ceramic and a carbon-containing material distributed in a matrix of the binder (formed from the polymeric particles that soften and melt to consolidate during the applying of heat and/or pressure).

Figure 5:
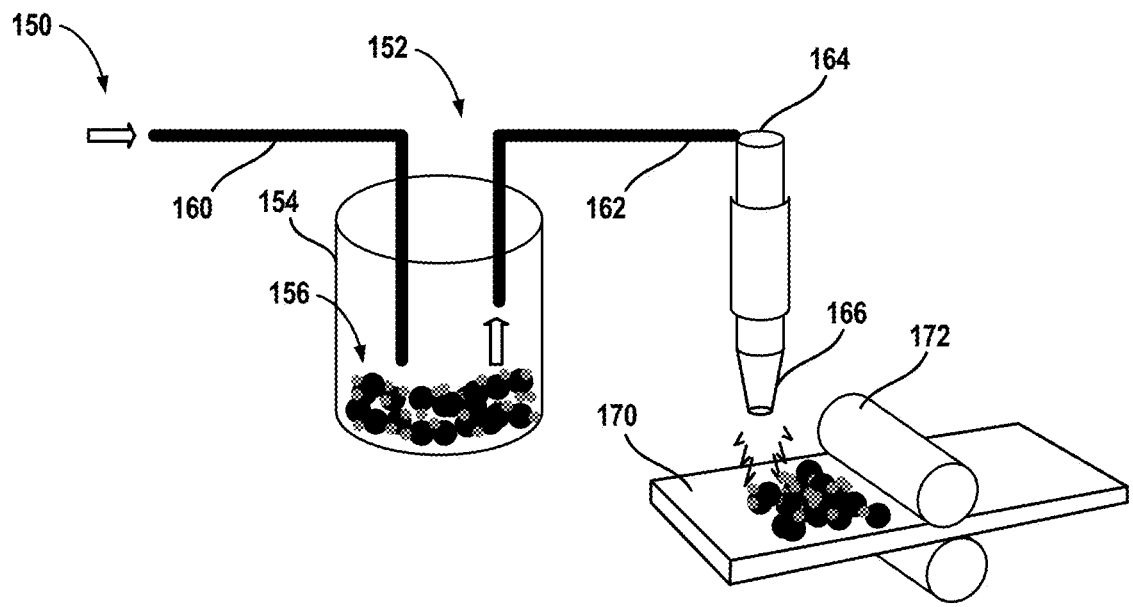
FIG. 5 shows an example of a system including a dry spray coating device and a hot roller for forming an electrode for an electrochemical cell in accordance with certain aspects of the present disclosure.

A dry spray coating device 150 is shown in FIG. 5. A powder-dispensing unit 152 includes a vessel 154 that contains a powder 156 formed as described above and having the plurality of coated particles with binder particles surrounding each of the coated particles. A carrier gas line 160 receives a carrier gas that is inert and non-reactive to the materials in the plurality of coated particles, for example, nitrogen, argon, carbon dioxide, helium, neon, and the like. The carrier gas line 160 delivers the carrier gas to the vessel 154 where it insufflates a portion of the powder 156. The insufflated powder enters a delivery line 162 that is delivered to a spray gun 164 having a nozzle 166. The insufflated powder thus is pressurized as it exits the nozzle 166 and deposited on a current collector 170. A voltage may be applied for electrostatic spraying. Furthermore, an electrostatic force generated during the dry spraying attracts the particles together on the current collector 170. In one variation, inlet gas pressures can be greater than or equal to about 1 psi to less than or equal to about 10 psi, such as about 5 psi. The operation electrostatic voltage can be greater than or equal to about 20 kV to less than or equal to about 30 kV, for example, about 25 kV. While the duration of spraying may vary depending on the thickness of the coating desired, in one example, a spraying time may be greater than or equal to about 15 seconds to less than or equal to about 90 seconds. A suitable spraying distance between the gun head/nozzle and substrate (current collector) can be greater than or equal to about 5 cm to less than or equal to about 15 cm. The processes may be conducted under ambient conditions, for example room temperature (e.g., around 20° C.).

In some embodiments, the method also includes calendaring the electrode between a flat surface and a roller or between two rollers to provide a desired level of porosity in the electrode. The porosity may be greater than or equal to about 15 vol. % to less than or equal to about 50 vol. % or greater than or equal to about 25 vol. % to less than or equal to about 35 vol. %.

As shown in FIG. 5, the current collector 170 having the deposited powder is then passed through a pair of heated rollers 172 to apply heat and pressure. In alternate variations, a pair of heated flat metal plates (not shown) may be used to apply heat and pressure. In this manner, the powder is consolidated to form a porous electrode on the current collector after pressing.

In certain aspects, a temperature applied by the pair of hot rollers is greater than or equal to about 30° C. to less than or equal to about 150° C., depending on the properties of the materials involved (especially the properties of the polymeric material). If the process involves a solid-state electrolyte, the temperature range may be higher. A continuous pressure of greater than or equal to about 1 Pa to less than or equal to about 10 MPa may be applied to the powder mixture as it is formed into the electrode. The amount of pressure applied and thickness of the electrode formed can be controlled by controlling a distance between the pair of rollers 172. In certain aspects, after being processed and calendared, a thickness of the electrode may be greater than or equal to about 5 μm to less than or equal to about 500 μm, optionally greater than or equal to about 50 μm to less than or equal to about 200 μm.

Notably, electrodes made by the present processes could be thicker than conventional electrodes due to the solvent-free formation process enabling a thicker electrode to be formed by electrostatic attraction between particles and enhanced performance due to the presence of a coating and superior mixing of the precursors that form the electrode. Solvent-free manufacturing eliminates the use of solvent mixing and solvent removal procedures during coating. Conventional slurry casting method may restrict the slurry based on viscosity and cast thickness. A thick loading of slurry onto the current collector could lead to inefficient and unexpected deposition of material during drying, which could potentially result in electrode defects. However, dry methods contemplated by the present disclosure can avoid this potential problem by being free of solvents. In this way, dry manufacturing methods have the ability to make thicker electrodes with even distribution and desirable properties.

Figure 6:
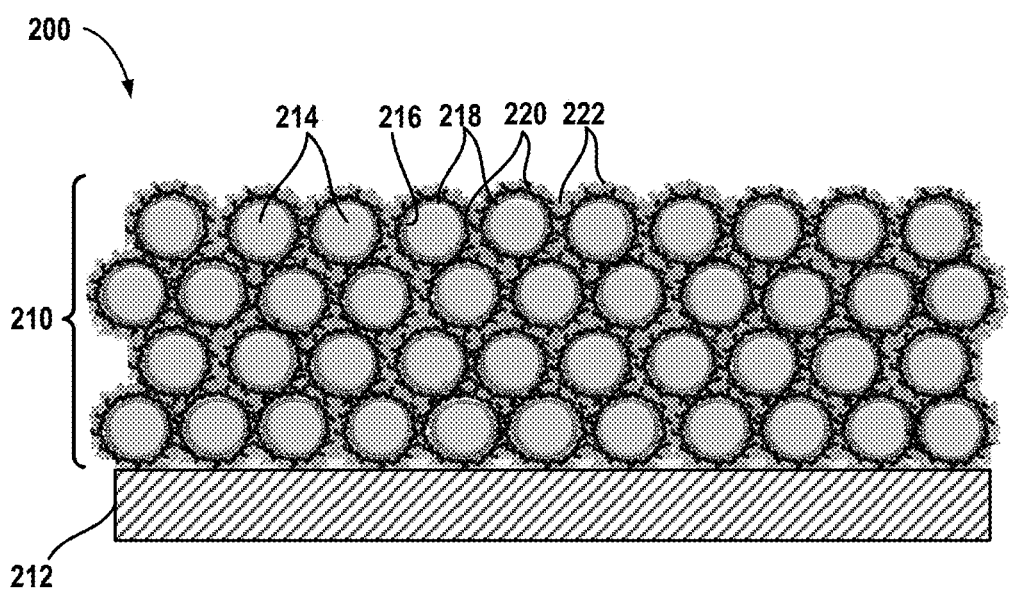
FIG. 6 illustrates an example of an electrode prepared in accordance with certain aspects of the present disclosure.

FIG. 6 shows an electrode 200 for an electrochemical cell that cycles lithium or sodium ions formed by the methods discussed above, including compression and shear mixing of a particle mixture of electrode precursors in a dry-coating device, followed by planetary and centrifugal mixing with a plurality of polymeric binder particles, and then dry spraying onto a current collector. By way of non-limiting example, the electrode 200 may be a positive electrode. A porous active layer 210 is disposed on a current collector 212. The porous active layer 210 comprises a plurality of electroactive particles 214, such as a transition metal containing electroactive material like $LiMnO_2$ (LMO). Each of the electroactive particles 214 defines a surface 216 having a coating. While the coating may be a hybrid/composite coating or a multilayered coating, it is shown as a multilayered coating in FIG. 6, by way of non-limiting example. Thus, a first coating 218 is disposed on the surface 216. A second coating 220 is disposed over the first coating 218. The first coating 218 may comprise a plurality of ceramic particles, like HF scavenging lithium zeolites. The second coating 220 may comprise a plurality of carbon-containing material particles, such as carbon black. Notably, the first coating 218 and the second coating 220 may not necessarily be discrete layers defining a multilayered structure, but as discussed above, may be a composite coating having a gradient or mixture of the ceramic particles and the carbon-containing material particles.

Further, a plurality of polymeric binder particles 222, such as polyvinylidene fluoride (PVDF), surrounds each of the plurality of coated electroactive particles 214. Notably, after calendaring, the plurality of polymeric binder particles 222 may be softened or melted to form a matrix of binder in which the coated electroactive particles 214 are distributed. In this manner, the plurality of electroactive particles 214 having the first coating 218 and the second coating 220 may be homogeneously distributed in a matrix of a polymeric binder formed from the plurality of polymeric binder particles 222 and thus define the porous active layer 210. For purposes of illustration, the binder particles 222 are shown prior to calendaring or consolidation in FIG. 6, but may have a denser arrangement after calendaring. It will further be appreciated that the ceramic particles and the carbon-containing material particles form an inner surface coated layer adjacent to the electroactive material while the binder particles form an outer layer encasing the coated electroactive material particles. As shown, multiple distinct layers of coated electroactive particles 214 have been deposited by dry spraying and thus the porous active layer 210 may comprise multiple distinct layers of electroactive particles 214 to a desired and predetermined thickness. In using a dry spraying process to fabricate electrodes, the solvent-free nature of dry spraying to create an electrode results in appropriate material distribution retained from dry mixing steps. Further, LMO/Li-Zeolite particles self-assemble with carbon and binder onto the current collector, and may then undergo hot pressing to finalize the thickness, porosity and bonding of the electrode, as will be described further below.

In certain variations, the plurality of electroactive particles 214, like $LiMnO_2$ (LMO) may be present in the porous active layer 210 of the electrode 200 at greater than or equal to about 60 wt. % to less than or equal to about 95 wt. % of the porous active layer 210. The plurality of ceramic particles, like HF scavenging lithium zeolites, may be present in the porous active layer 210 of the electrode 200 at greater than or equal to about 0.1 wt. % to less than or equal to about 20 wt. % of the porous active layer 210. The plurality of carbon-containing material particles, such as carbon black, may be present in the porous active layer 210 of the electrode 200 at greater than or equal to about 1 wt. % to less than or equal to about 20 wt. % of the porous active layer 210. Further, the porous active layer 210 may have greater than or equal to about 1 wt. % to less than or equal to about 20 wt. % of the polymeric binder.

In this manner, electrodes may be formed advantageously incorporating a ceramic HF scavenger and carbon-containing material on the electroactive material as a coating and therefore distributed in and embedded within the electrode. For example, Li-zeolite, as a cathode additive for Li-ion batteries, requires a proper distribution within the electrode microstructure to effectively react with HF and efficiently mitigate transition-metal dissolution. In certain aspects, the electroactive material particles having the ceramic HF scavenger, like Li-zeolite, and carbon-containing coating(s) are homogeneously distributed within the electrode. Accordingly, when the electrode is incorporated within an electrochemical cell or battery, which may also include a cathode comprising a transition metal oxide or a transition metal polyanion and an electrolyte that is capable of reacting with water to form HF, and HF is formed within the electrolyte, the ceramic HF scavenger incorporates the hydrogen atom from the HF. The HF is then incapable of reacting with the transition metal oxides or transition metal polyanions in the cathode, which results in the prevention, inhibition, or minimization of transition metal dissolution at the cathode. The carbon-containing material provides electrical conductivity to the surface region of the electroactive material particle to enhance electrochemical performance of the electrode.

In some embodiments, the electrode is a positive electrode or cathode (e.g., the electrode active material is a transition metal oxide or transition metal polyanion), which is located within an electrochemical cell or battery that also includes an electrolyte that is capable of reacting with water to form HF. When HF is formed within the electrolyte, the ceramic HF scavenger scavenges and incorporates the hydrogen atom from the HF. The HF is then rendered incapable of reacting with transition metal oxides or transition metal polyanions in the cathode, which results in the prevention, inhibition, or minimization of transition metal dissolution at the cathode.

In other embodiments, the electrode is a negative electrode or anode (e.g., the electrode active material is an anode active material), which is located within an electrochemical cell or battery that also includes a cathode having a transition metal in its positive active material and an electrolyte that is capable of reacting with water to form HF. When HF is formed within the electrolyte, the ceramic HF scavenger scavenges and incorporates the hydrogen atom from the HF. The HF is then rendered incapable of reacting with transition metal oxides or transition metal polyanions in the cathode, which results in in the prevention, inhibition, or minimization of transition metal dissolution at the cathode.

In certain aspects, the present disclosure thus contemplates employing multiple distinct dry mixing process methods (compression/shearing mixing and planetary/centrifugal mixing) for enhancing the distribution of functional ceramic powders and polymer binders within electrodes. Separate dry mixing processes for ceramic-based and polymer-based materials can facilitate good material distribution and coating behaviors on active material particles. Further, the dry coating process helps to provide proper particle distribution achieved during dry mixing and is retained during fabrication of electrodes for lithium ion batteries. This serves to improve the cyclability of electrolyte and to enhance the cycle stability of transitional metal oxide positive electroactive material. More specifically, ceramic-based additives and carbon may be uniformly coated onto dry active material particles by elliptical rotating (applying shear force between small and large particles) in a compression/shearing mixing process. Planetary mixing further helps to disperse polymer-based binder/additives into the dry material mixture while introducing less electrostatic force among polymer particles and thus avoiding agglomeration of polymer binder. The dry processes materials can then be directly processed into electrodes by dry spraying, which helps maintain the proper distribution of materials and particles. The combination of dry coating and dry mixing techniques provided by the present disclosure can be extended to incorporate different material designs and electrode manufacturing for similar applications. Moreover, no organic solvents are involved during the process, thus, enabling a more environmentally friendly and lower-cost manufacturing process.

Embodiments of the present technology are further illustrated through the following non-limiting examples.

EXAMPLE 1

Figure 7:
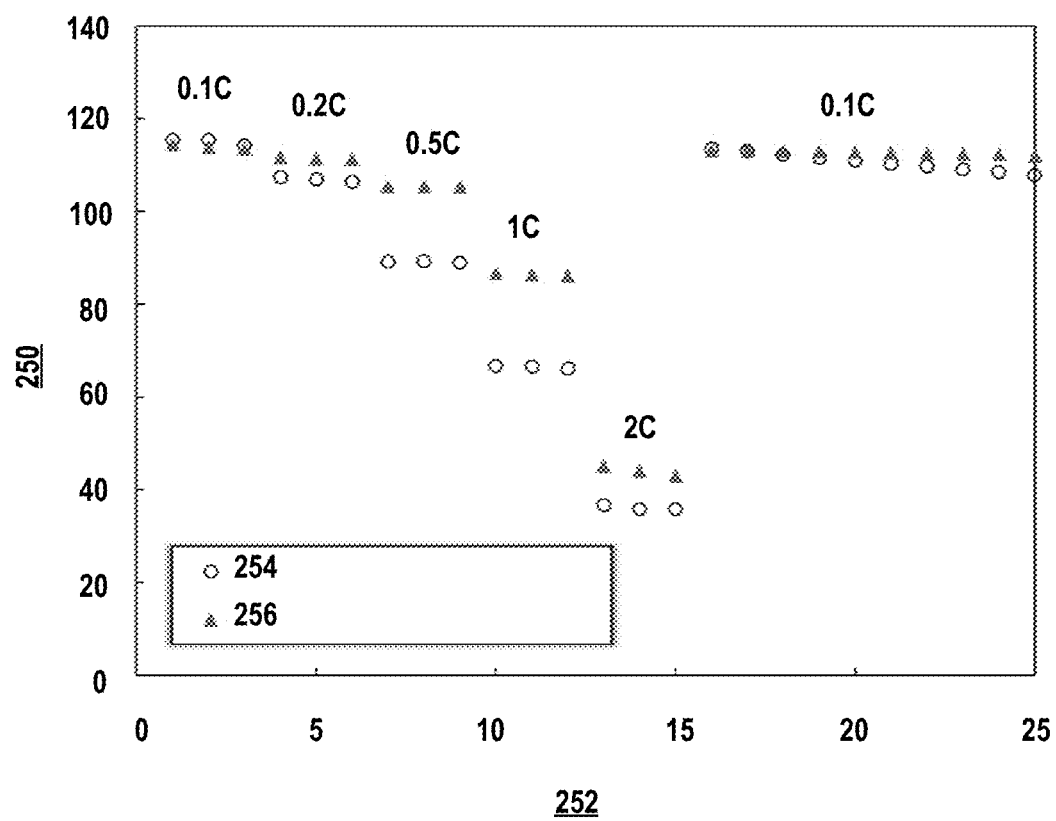
FIG. 7 is a graph comparing rate performance of a comparative electrode that is slurry cast versus an electrode that is dry mixed in accordance with certain aspects of the present disclosure when incorporated into a half-cell.

Rate performance comparison between slurry casting and dry processing of electrodes are described herein and results are shown in FIG. 7. Generally, adding Li-zeolite into a cathode can improve the cycle stability, especially at high temperatures. However, the conventional powder mixing process leads to a relatively poor dispersion in slurry cast samples, in which ceramic-based additives show a random and uneven manner of distribution. The following example addresses the differences in performance.

A cathode including a LMO active material that is coated with a composition including carbon black and further has a PVDF binder is slurry cast as a comparative example and fabricated according the current methods by the dry coating and planetary mixing processes described above. For slurry cast samples, 90 wt. % LMO, 5 wt. % carbon, and 5 wt. % PVDF is used to prepare the baseline electrode. The entire procedure is conducted at 20° C.-35° C. in the open atmosphere with MTI Dr. Blade caster machine.

For the dry manufactured sample, 90 wt. % LMO, 5 wt. % carbon and 5 wt. % PVDF are used to prepare the electrode. The entire procedure is conducted at 20° C.-35° C. in an open atmosphere with method described above. First, the mixture of LMO and carbon are processed in a Theta Composer® dry-coating device where the vessel rotates at 75 rpm, while the inner rotor rotates at 2,000 rpm. The mixing process is conducted 2 times at 30 minutes of each cycle. After the carbon coating is formed on LMO, the carbon-coated LMO particles are mixed with the PVDF particles in a Thinky™ planetary and centrifugal mixer set to have a revolution rate of 880 rpm and a rotation rate of 880 rpm. The mixing is conducted for 4 cycles each lasting 3 minutes. The areal loading of electroactive material in the comparative slurry cast sample is 1.38 mAh/cm$^2$, while the areal loading of the electroactive material in the dry processed example prepared in accordance with certain aspects of the present disclosure is 2.89 mAh/cm$^2$.

The cathodes are incorporated into coin cells with 20 μL or 1 M LiPF$_6$ in fluoroethylene carbonate (FEC)/ethyl methyl carbonate (EMC) electrolyte in a 1:4 volume ratio for a half-cell test. Constant charging/discharging cycling is used for all tests. Two formation cycles on 0.1 C are run on all the cells before testing. Rate performance in FIG. 7 is tested at 0.1 C, 0.2 C, 0.5 C, 1 C, 2 C and 0.1 C for the remainder of cycling at a temperature of about 25° C.

FIG. 7 is a graph having a first y-axis 250 representing specific discharge capacity (mAh/g) versus an x-axis 252 representing cycle number (from 0 to 25 cycles). The comparative sample with slurry mixing having the coated LMO material is represented by 254, while the sample prepared in accordance with dry mixing processes provided by certain aspects of the present disclosure is represented by 256. Compared to the slurry-cast baseline sample 254, better material distribution in the dry mixed example 256 results in a rate performance and a better capacity retention during the following cycles at a rate of 0.1 C.

EXAMPLE 2

Figure 8:
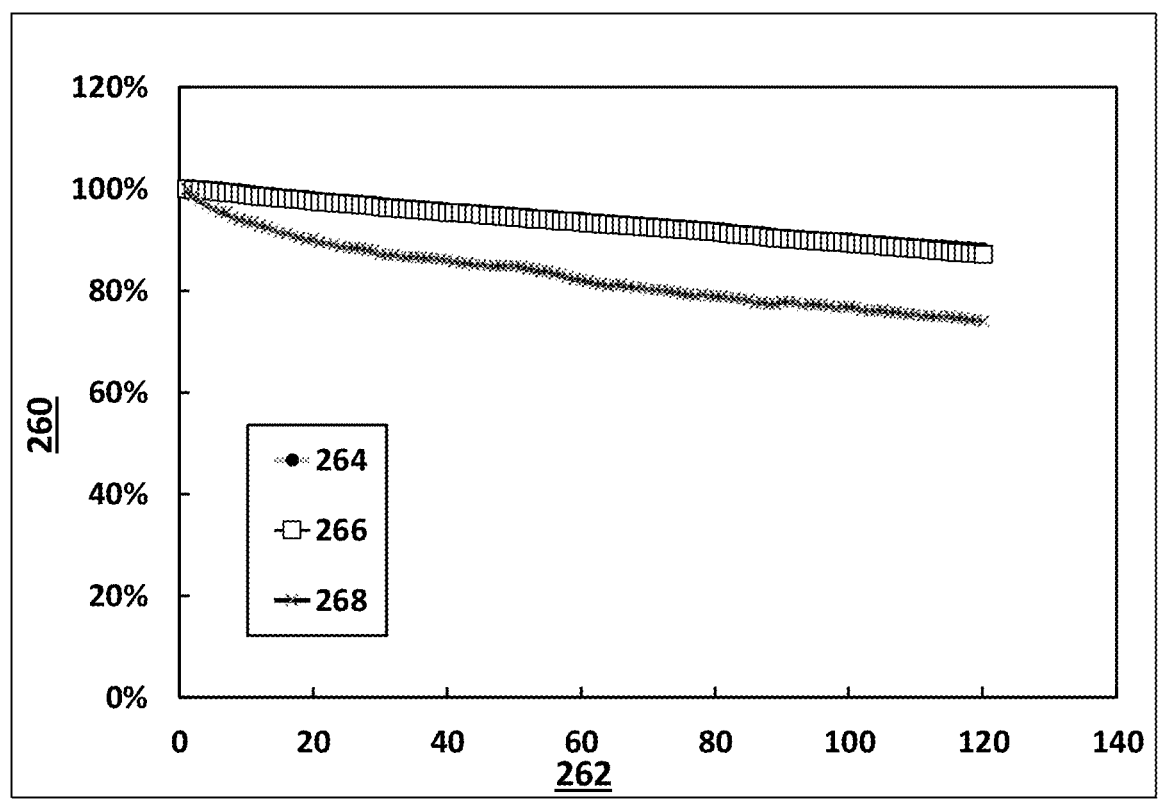
FIG. 8 is a graph comparing discharge capacity retention from 0 to 120 cycles for a comparative electrode that is slurry cast comprising a lithium manganese oxide (LMO) positive electroactive material, a comparative electrode that is dry mixed and has an LMO positive electroactive material, and an electrode that is dry mixed and has both an LMO positive electroactive material and a lithium-zeolite/ceramic HF scavenger prepared in accordance with certain aspects of the present disclosure when incorporated into a half-cell.
Figure 9:
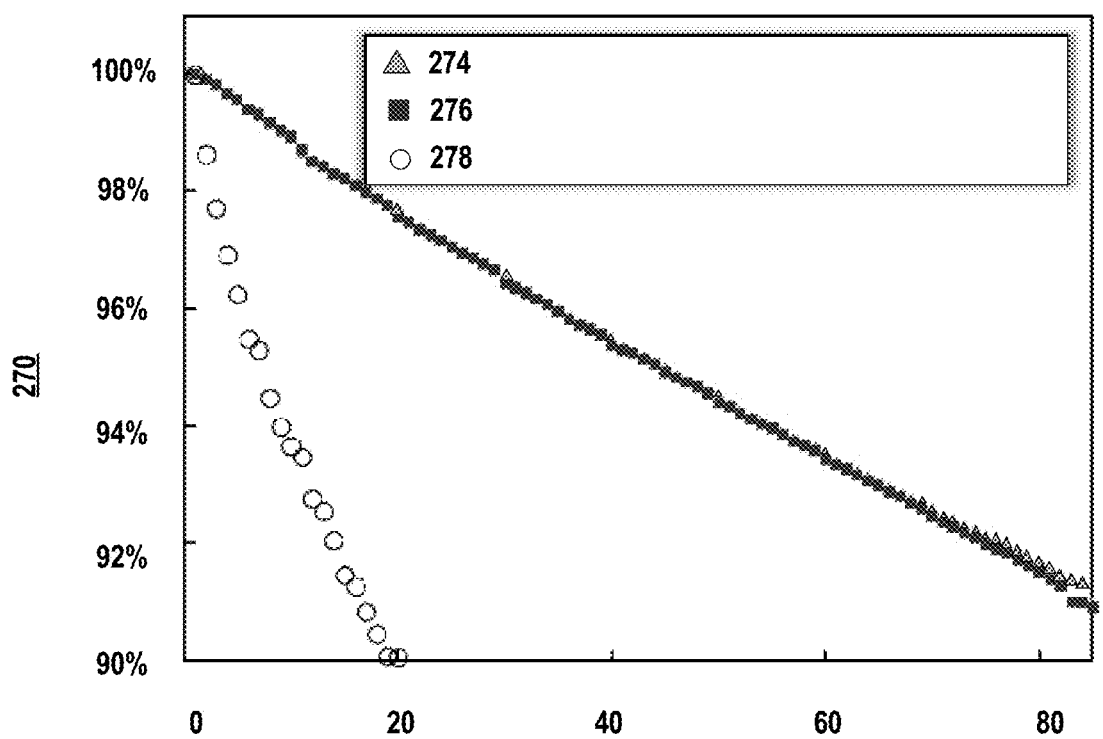
FIG. 9 is a graph comparing discharge capacity retention from 90 to 100% for a comparative electrode that is slurry cast comprising a lithium manganese oxide (LMO) positive electroactive material, a comparative electrode that is dry mixed and has an LMO positive electroactive material, and an electrode that is dry mixed and has both an LMO positive electroactive material and a lithium-zeolite/ceramic HF scavenger prepared in accordance with certain aspects of the present disclosure when incorporated into a half-cell.

An additional comparison of performance between a slurry casting and dry processing of electrodes including LMO, both with and without a HF scavenging Li-zeolite ceramic additive are described herein and results are shown in FIGS. 8 and 9.

For the slurry cast samples, 90 wt. % LMO, 5 wt. % carbon, and 5 wt. % PVDF is used to prepare the comparative sample electrode. The entire procedure is conducted at 20° C.-35° C. in the open atmosphere with MTI Dr. Blade caster machine.

For the dry manufactured samples, 90 wt. % LMO, 5 wt. % carbon and 5 wt. % PVDF are used to prepare a baseline electrode. Further, 87 wt. % LMO, 5 wt. % carbon, 3 wt. % $Li_2SiO_3$, and 5 wt. % PVDF are used to prepare the dry manufactured electrode incorporating the ceramic additive. For both samples, the entire procedure is conducted at 20° C.-35° C. in an open atmosphere with method described above. For the baseline electrode, the mixture of LMO and carbon are processed in a Theta Composer® dry-coating device. For the ceramic additive electrode, the mixture of LMO, carbon, and $Li_2SiO_3$ are also processed in the Theta Composer® dry-coating device. For both electrodes, the vessel rotates at 75 rpm, while the inner rotor rotates at 2,000 rpm. Each mixing process is conducted 2 times at 30 minutes of each cycle. After the carbon coating is formed on LMO for the baseline electrode or the composite coating comprising carbon and $Li_2SiO_3$, the coated LMO particles are mixed with the PVDF particles in a Thinky™ planetary and centrifugal mixer set to have a revolution rate of 880 rpm and a rotation rate of 880 rpm. The mixing is conducted for 4 cycles each lasting 3 minutes.

The cathodes are incorporated into coin cells with 20 μL or 1 M $LiPF_6$ in fluoroethylene carbonate (FEC)/ethyl methyl carbonate (EMC) electrolyte in a 1:4 volume ratio for a half-cell test cycled at a temperature of about 25° C. Constant charging/discharging cycling is used for all tests. Two formation cycles on 0.1 C are run on all cells before testing. Cycling performance in FIGS. 8 and 9 is tested at C/3.

Capacity retention results are shown in FIGS. 8 and 9. In FIG. 8, a y-axis 260 represents discharge capacity retention ratio (from 0% to 120%) and an x-axis 262 representing cycle number (from 0 to 120 cycles). The sample of a baseline LMO with no zeolite/ceramic formed by dry mixing is represented by 264, while the example having 3 wt. % Li-zeolite prepared in accordance with certain aspects of the present disclosure is represented by 266. The comparative slurry mixed/cast sample having a coated LMO, but lacking the Li-zeolite ceramic is represented by 268. In FIG. 9, a y-axis 270 represents discharge capacity retention ratio (from 90% to 100%) and an x-axis 272 representing cycle number (from 0 to 80 cycles). The sample of a baseline LMO with no zeolite/ceramic formed by dry mixing is represented by 274, while the example having 3 wt. % Li-zeolite prepared in accordance with certain aspects of the present disclosure is represented by 276. The comparative slurry mixed/cast sample having a coated LMO, but lacking the Li-zeolite ceramic is represented by 278.

Electrodes prepared by dry mixing/coating, namely dry-mixed sample 264/274 and dry-mixed example 266/276 prepared in accordance with certain aspects of the present disclosure show better and more consistent performance results, and outperform the slurry cast baseline sample 268/278 in 80 cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a component for an electrochemical cell, the method comprising:
    forming a plurality of coated particles each having a surface coating disposed over a core region by processing a particle mixture comprising a plurality of first inorganic particles and a plurality of second inorganic particles in a dry-coating device comprising a rotatable vessel defining a cavity with a rotor disposed within the cavity by rotating the rotatable vessel at a first speed in a first direction and rotating the rotor at a second speed greater than the first speed in a second direction opposite to the first direction to create the plurality of coated particles, wherein the core region comprises one of the first inorganic particles and the surface coating comprises a portion of the plurality of the second inorganic particles; and
    mixing the plurality of coated particles with a plurality of polymeric particles in a planetary and centrifugal mixer that rotates about a first axis and revolves about a second axis, so that a portion of the plurality of polymeric particles surrounds each of the plurality of coated particles.

2. The method of claim 1, wherein the particle mixture further comprises a plurality of third particles and the surface coating comprises the portion of the plurality of the second inorganic particles and further comprises a portion of the plurality of the third particles.

3. The method of claim 1, wherein the processing includes initially introducing the particle mixture comprising the plurality of first inorganic particles and the plurality of second inorganic particles in the dry-coating device, wherein the plurality of coated particles each has a first coating comprising the plurality of second inorganic particles disposed over the core region and the processing further includes subsequently adding a plurality of third particles in the dry-coating device and further rotating the rotatable vessel at the first speed in the first direction and rotating the rotor at the second speed in the second direction to form a second coating comprising the plurality of third particles disposed over the first coating, so that the surface coating is multilayered.

4. The method of claim 1, wherein the first speed of the rotatable vessel is greater than or equal to about 50 rpm to less than or equal to about 100 rpm and the second speed of the rotor is greater than or equal to about 1,000 rpm to less than or equal to about 10,000 rpm and the rotatable vessel and the rotor are rotated for greater than or equal to about 5 minutes to less than or equal to about 300 minutes.

5. The method of claim 1, wherein the planetary and centrifugal mixer rotates about the first axis at greater than or equal to about 100 rpm to less than or equal to about 1,000 rpm and revolves about the second axis at greater than or equal to about 100 rpm to less than or equal to about 1,000 rpm and the planetary and centrifugal mixer is operated for greater than or equal to about 30 seconds to less than or equal to about 15 minutes.

6. The method of claim 1, wherein the particle mixture flows between a wall defining the cavity and the rotor at a clearance of greater than or equal to about 0.025 mm to less than or equal to about 1 mm, wherein the particle mixture is subjected to shear forces and compression to create a substantially uniform surface coating comprising the portion of the plurality of the second inorganic particles.

7. The method of claim 1, wherein the surface coating covers greater than or equal to about 70% of an exposed surface of the core region of each of the first inorganic particles.

8. The method of claim 1, wherein a first average diameter ($D_1$) of the plurality of the first inorganic particles is greater than or equal to about 1 µm to less than or equal to about 100 µm, a second average diameter ($D_2$) of the plurality of the second inorganic particles is greater than 100 nm to less than or equal to about 5 µm, a third average diameter ($D_3$) of the plurality of the third particles is greater than 50 nm to less than or equal to about 50 µm, and fourth average diameter ($D_4$) of the polymeric particles is greater than or equal to about 10 nm to less than or equal to about 10 µm.

9. The method of claim 1, wherein the plurality of first inorganic particles comprises an electroactive material, the plurality of second inorganic particles comprises a ceramic material, and the plurality of third particles comprises an electrically conductive carbon-containing material.

10. The method of claim 1, wherein the plurality of first inorganic particles comprises an electroactive material selected from the group consisting of: lithium manganese oxide ($Li_{(1+x)}Mn_{(2-x)}O_4$), where $0 \le x \le 1$ (LMO), lithium manganese nickel oxide ($LiMn_{(2-x)}Ni_xO_4$), where $0 \le x \le 1$ (LMNO), doped and undoped lithium nickel manganese cobalt oxide ($Li(Ni_xMn_yCo_z)O_2$), where $0 \le x \le 1$, $0 \le y \le 1$, $0 \le z \le 1$, and $x+y+z=1$ (NMC), and Ni-rich $Li[Ni_{0.89}Co_{0.05}Mn_{0.05}Al_{0.01}]O_2$ (NCMA), NCMA, and combinations thereof;

the plurality of second inorganic particles comprises a ceramic hydrogen fluoride (HF) scavenger comprising $M_2SiO_3$, $MAlO_2$, $M_2O—Al_2O_3—SiO_2$, $Al_2O_3$, $SiO_2$, $ZrO_2$, $MgO$, $Nb_2O_5$, or combinations thereof, where M is Li, Na, or combinations thereof or an oxide-based solid electrolyte comprising $Li_5La_3M_2O_{12}$, $Li_2O—La_2O_3-M_2O_5$, where M is niobium (Nb) or tantalum (Ta), $LiAlTi(PO_4)_2$, $Li_{2+2x}Zn_{1-x}GeO_4$, or $Li_{(3+x)}Ge_xV_{(1-x)}O_4$, where x is 0 and 1, or combinations thereof;

the plurality of third particles comprises an electrically conductive carbon-containing material selected from the group consisting of: carbon black, acetylene black, carbon nanotubes, and combinations thereof; and the plurality of polymeric particles is selected from the group consisting of: polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, and combinations thereof.

11. A method of making an electrode for an electrochemical cell without solvents, the method comprising:
forming a plurality of coated particles each having a surface coating disposed over a core region by processing a plurality of first particles comprising an electroactive material, a plurality of second particles comprising a ceramic material, and a plurality of third particles comprising a carbon-containing material in a dry-coating device comprising a rotatable vessel defining a cavity with a rotor disposed within the cavity, by rotating the rotatable vessel at a first speed in a first direction and rotating the rotor at a second speed greater than the first speed in a second direction opposite to the first direction, wherein the core region comprises a portion of the plurality of the first particles and the surface coating comprises a portion of the plurality of the second particles and a portion of the plurality of the third particles;
mixing the plurality of coated particles with a plurality of binder particles in a planetary and centrifugal mixer that rotates about a first axis and revolves about a second axis to form a mixture in which a portion of the plurality of binder particles surrounds each of the plurality of coated particles;
dry spraying the mixture onto a current collector; and
consolidating the mixture by applying heat and pressure to form a porous electrode comprising the plurality of first particles comprising an electroactive material having a coating comprising a ceramic and a carbon-containing material distributed in a matrix of the binder.

12. The method of claim 11, wherein the first speed of the rotatable vessel is greater than or equal to about 50 rpm to less than or equal to about 100 rpm and the second speed of the rotor is greater than or equal to about 1,000 rpm to less than or equal to about 10,000 rpm and the rotatable vessel and the rotor are rotated for greater than or equal to about 5 minutes to less than or equal to about 300 minutes.

13. The method of claim 11, wherein the planetary and centrifugal mixer rotates about the first axis at greater than or equal to about 100 rpm to less than or equal to about 1,000 rpm and revolves about the second axis at greater than or equal to about 100 rpm to less than or equal to about 1,000 rpm and the planetary and centrifugal mixer is operated for greater than or equal to about 30 seconds to less than or equal to about 15 minutes.

14. The method of claim 11, wherein the plurality of first particles, the plurality of second particles, and the plurality of third particles flows between a wall defining the cavity and the rotor at a clearance of greater than or equal to about 0.025 mm to less than or equal to about 1 mm, wherein the plurality of first particles, the plurality of second particles, and the plurality of third particles are subjected to shear forces and compression to create a substantially uniform surface coating comprising the portion of the plurality of the second particles and the portion of the plurality of the third particles.

15. The method of claim 11, wherein the surface coating covers greater than or equal to about 70% of an exposed surface of the core region of each of the first particles.

16. The method of claim 11, wherein the consolidating is conducted by passing the mixture between a pair of hot rollers or a pair of hot plates, wherein a temperature applied by the pair of hot rollers or the pair of hot plates is greater than or equal to about 30° C. to less than or equal to about 150° C. and a pressure applied is greater than or equal to about 1 Pa to less than or equal to about 10 MPa, wherein the electrode formed has a porosity of greater than or equal to about 15 vol. % to less than or equal to about 50 vol. % and a thickness of the electrode is greater than or equal to about 5 µm to less than or equal to about 500 µm.

17. The method of claim 11, wherein the plurality of first particles comprising the electroactive material is selected from the group consisting of: lithium manganese oxide ($Li_{(1+x)}Mn_{(2-x)}O_4$), where $0 \le x \le 1$ (LMO), lithium manganese nickel oxide ($LiMn_{(2-x)}Ni_xO_4$), where $0 \le x \le 1$ (LMNO), doped and undoped lithium nickel manganese cobalt oxide ($Li(Ni_xMn_yCo_z)O_2$), where $0 \le x \le 1$, $0 \le y \le 1$, $0 \le z \le 1$, and $x+y+z=1$ (NMC), Ni-rich $Li[Ni_{0.89}Co_{0.05}Mn_{0.05}Al_{0.01}]O_2$ (NCMA), and combinations thereof;

the plurality of second particles comprising the ceramic material is selected from the group consisting of: $Li_2SiO_3$, $LiAlO_2$, $Li_2O-Al_2O_3-SiO_2$, $Na_2SiO_3$, $NaAlO_2$, $Na_2O-Al_2O_3-SiO_2$, $Al_2O_3$, $SiO_2$, $ZrO_2$, $MgO$, $Nb_2O_5$, $Li_5La_3M_2O_{12}$, where M is niobium (Nb) or tantalum (Ta), $Li_2O-La_2O_3-M_2O_5$, where M is niobium (Nb) or tantalum (Ta), $LiAlTi(PO_4)_2$, $Li_{2+2x}Zn_{1-x}GeO_4$ or $Li_{(3+x)}Ge_xV_{(1-x)}O_4$, where x is 0 and 1, or combinations;

the plurality of third particles comprising a carbon-containing material is selected from the group consisting of: carbon black, acetylene black, carbon nanotubes, and combinations thereof; and the plurality of binder particles is selected from the group consisting of: polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, and combinations thereof.

18. A component for an electrochemical cell made by the method of claim 1.

19. An electrode for an electrochemical cell made by the method of claim 11.

* * * * *